United States Patent
Perrin et al.

(10) Patent No.: US 10,051,084 B2
(45) Date of Patent: Aug. 14, 2018

(54) METHODS AND SYSTEMS FOR BANDWIDTH-EFFICIENT REMOTE PROCEDURE CALLS

(71) Applicant: KABUSHIKI KAISHA SQUARE ENIX HOLDINGS, Tokyo (JP)

(72) Inventors: Cyril Perrin, Antony (FR); Tetsuji Iwasaki, Quebec (CA)

(73) Assignee: KABUSHIKI KAISHA SQUARE ENIX HOLDINGS, Tokyo (JP)

(*) Notice: Subject to any disclaimer, the term of this patent is extended or adjusted under 35 U.S.C. 154(b) by 634 days.

(21) Appl. No.: 14/410,842

(22) PCT Filed: Apr. 15, 2013

(86) PCT No.: PCT/IB2013/001045
§ 371 (c)(1),
(2) Date: Dec. 23, 2014

(87) PCT Pub. No.: WO2014/001862
PCT Pub. Date: Jan. 3, 2014

(65) Prior Publication Data
US 2015/0156278 A1    Jun. 4, 2015

Related U.S. Application Data

(60) Provisional application No. 61/666,023, filed on Jun. 29, 2012, provisional application No. 61/666,018, filed on Jun. 29, 2012.

(30) Foreign Application Priority Data

Oct. 22, 2012   (CA) ...................... 2793154

(51) Int. Cl.
*H04L 29/06*  (2006.01)
*G06F 9/54*   (2006.01)
(Continued)

(52) U.S. Cl.
CPC .............. *H04L 67/40* (2013.01); *A63F 13/53* (2014.09); *G06F 9/547* (2013.01); *H04L 47/24* (2013.01);
(Continued)

(58) Field of Classification Search
USPC ........................................... 463/31
See application file for complete search history.

(56) References Cited

U.S. PATENT DOCUMENTS 7,566,274 B2 * 7/2009 Johnson .............. G07F 17/3262
273/309
8,681,813 B2 * 3/2014 Jain ........................ H04L 47/38
370/466

(Continued)

OTHER PUBLICATIONS

U.S. Appl. No. 14/366,444 to Cyril Perrin, filed Jun. 18, 2014.

*Primary Examiner* — Pierre E Elisca
(74) *Attorney, Agent, or Firm* — Greenblum & Bernstein, P.L.C.

(57) ABSTRACT

A local device obtains at least one instruction for execution by a remote device (e.g., instructions to render a game screen of a video game). A packet representing the at least one instruction is created, and released towards the remote device. Creation of the packet involves consulting a packet dictionary to determine whether a packet index has already been assigned to the at least one instruction. If this is the case, the packet is formulated so that it contains the packet index; otherwise, the packet is formulated to include a function identifier and a set of parameters, which are associated with the at least one instruction. Since fewer bits are needed to encode the packet index than to encode the function identifier and the set of parameters, transmitted packets can be condensed when they represent at least one instruction for which a packet had previously been transmitted.

10 Claims, 27 Drawing Sheets

(51) Int. Cl.
*A63F 13/53* (2014.01)
*H04L 12/851* (2013.01)
*H04L 12/931* (2013.01)
*H04L 29/08* (2006.01)

(52) U.S. Cl.
CPC ............ *H04L 49/205* (2013.01); *H04L 67/12* (2013.01); *H04L 69/04* (2013.01)

(56) References Cited

U.S. PATENT DOCUMENTS

| | | | |
|---|---|---|---|
| 9,094,374 B2* | 7/2015 | Jain | H04L 47/38 |
| 9,185,172 B2* | 11/2015 | Pahlavan | H04L 63/08 |
| 2004/0162137 A1* | 8/2004 | Eliott | A63F 13/12 |
| | | | 463/29 |
| 2013/0136125 A1* | 5/2013 | Jain | H04L 47/38 |
| | | | 370/392 |
| 2015/0011313 A1* | 1/2015 | Ikenaga | A63F 13/358 |
| | | | 463/31 |

* cited by examiner

| Client Device Identifier |   |
|---|---|
| Movement Information |   |
|   | Magnitude |
|   | Direction |
| Action Information |   |
| Rendering Range |   |
| Display Setting |   |

FIG. 5A

| Rendering Object 1 |   |
|---|---|
| Identification Information 1 |   |
| Detailed Information 1 |   |
|   | Model Data Identification Information 1 |
|   | Texture Data Identification Information 1 |
|   | Rendering Program Specifying Information 1 |
|   | Data for Calculations Specifying Information 1 |
| State Information 1 |   |
| Rendering Object 2 |   |
| Identification Information 2 |   |
| ⋮ | ⋮ |
| State Information n |   |
| Rendering Range |   |
| Display Setting |   |

METHODS AND SYSTEMS FOR BANDWIDTH-EFFICIENT REMOTE PROCEDURE CALLS

CLAIM FOR PRIORITY

This application is a U.S. National Stage of PCT/IB2013/001045 filed on Apr. 15, 2013, and claims the priority benefit of U.S. provisional application 61/666,018, filed Jun. 29, 2012; U.S. provisional application 61/666,023, filed Jun. 29, 2012; and Canadian application 2,793,154, filed Oct. 22, 2012, the contents of which is expressly incorporated by reference herein in their entireties.

FIELD OF THE INVENTION

The present invention relates generally to communications between computing devices over a network and, more particularly, to an approach for efficient usage of network resources, particularly bandwidth, when a first computing device calls functions to be executed on a second computing device.

BACKGROUND

In the entertainment world, it has become commonplace to offer real-time or near-real-time delivery of voice, music, video and other forms of data over private and public data networks.

While users can obtain much enjoyment by using their computing devices to passively receive the aforementioned forms of media over a network, a superior user experience can be enabled when the user is allowed to influence or otherwise participate in what is being delivered. An often-cited example is IPTV, where user input is monitored and used to adapt the nature of the television signal being delivered to the user, typically over a private data network that provides a guaranteed bandwidth. A different example is Skype, where users participate in a video or audio conference that is supported over the Internet rather than over a private data network.

The video game industry also has much to offer by harnessing the power of the Internet. As Internet connections become faster and more reliable, it becomes feasible to transmit larger amounts of graphics generated at a central source to participants in a video game. Moreover, because images are rendered in the "cloud", users can use ordinary PCs, tablets or smartphones to partake in the gaming experience, thus bypassing the need for expensive video game consoles. This is known as a cloud gaming system.

In a cloud gaming system, the computational burden is shifted to the game provider. However, the game provider's resources available are not limitless. From a practical perspective, limits on computational resources can impact the realism of the game or the number of users who can concurrently play a version of the game at any given time, or both.

To handle the added computational burden of a cloud-based solution, some cloud gaming providers are shifting to a model in which the game state is monitored by one computer and rendering is carried out by another computer. To achieve rendering, a rendering command is placed by the game state computer and executed by the rendering computer. However, this configuration places demands on the interconnection bandwidth between the two computers, and therefore it becomes of importance to efficiently use this bandwidth when remotely executing rendering commands. Similar considerations apply to other industries where remote procedure calls are used in high volume.

SUMMARY OF THE INVENTION

According to a non-limiting embodiment of the present disclosure, a device connectable to a remote device is provided. The device includes a processor and a first memory. The first memory includes program instructions that, when executed by the processor, cause the processor to perform operations including: obtaining at least one rendering instruction for execution by the remote device; creating a packet representing the at least one rendering instruction; and releasing the packet towards the remote device. The at least one rendering instruction is for rendering at least a portion of a game screen of a video game. The processor consults the first memory or a second memory to determine, as a determination, whether a packet index has already been assigned to the at least one rendering instruction. When the determination is positive, the processor formulates the packet to contain the packet index.

According to another non-limiting embodiment of the present disclosure, a non-transitory computer-readable medium is provided. The non-transitory computer-readable medium stores instructions for execution by at least one processor of a local device. The execution of the instructions by the at least one processor of the local device causes the local device to implement a method. The method includes: obtaining an identifier of at least one command for execution by a remote device; creating a packet representing the at least one command; and releasing the packet towards the remote device. The creating of the packet includes consulting a memory to determine, as a determination, whether a packet index has already been assigned to the at least one command. When the determination is positive, the packet is formulated to contain the packet index.

According to yet another non-limiting embodiment of the present disclosure, a device connectable to a first device is provided. The device includes a processor and a memory. The memory includes instructions that, when executed by the processor, cause the processor to perform operations including: obtaining from the first device a packet comprising a packet index associated with a remote function call placed by the first device; consulting a packet dictionary based on the packet index to identify a function associated with the remote function call and to determine a combination of parameters associated with the remote function call; and carrying out the function using parameters in the combination of parameters.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 5A illustrates a data structure for playing character input information that may be received from a client device;

FIG. 5B illustrates a data structure for a rendering instruction that may be issued by a game state management process being executed on the central server;

FIG. 11B shows a sequence dictionary for use in the marshalling process of FIG. 11A, in accordance with a non-limiting embodiment of the present invention;

It is to be expressly understood that the description and drawings are only for the purpose of illustration of certain embodiments of the invention and are an aid for understanding. They are not intended to be a definition of the limits of the invention.

DETAILED DESCRIPTION a. Cloud-Based Architecture

Figure 1:
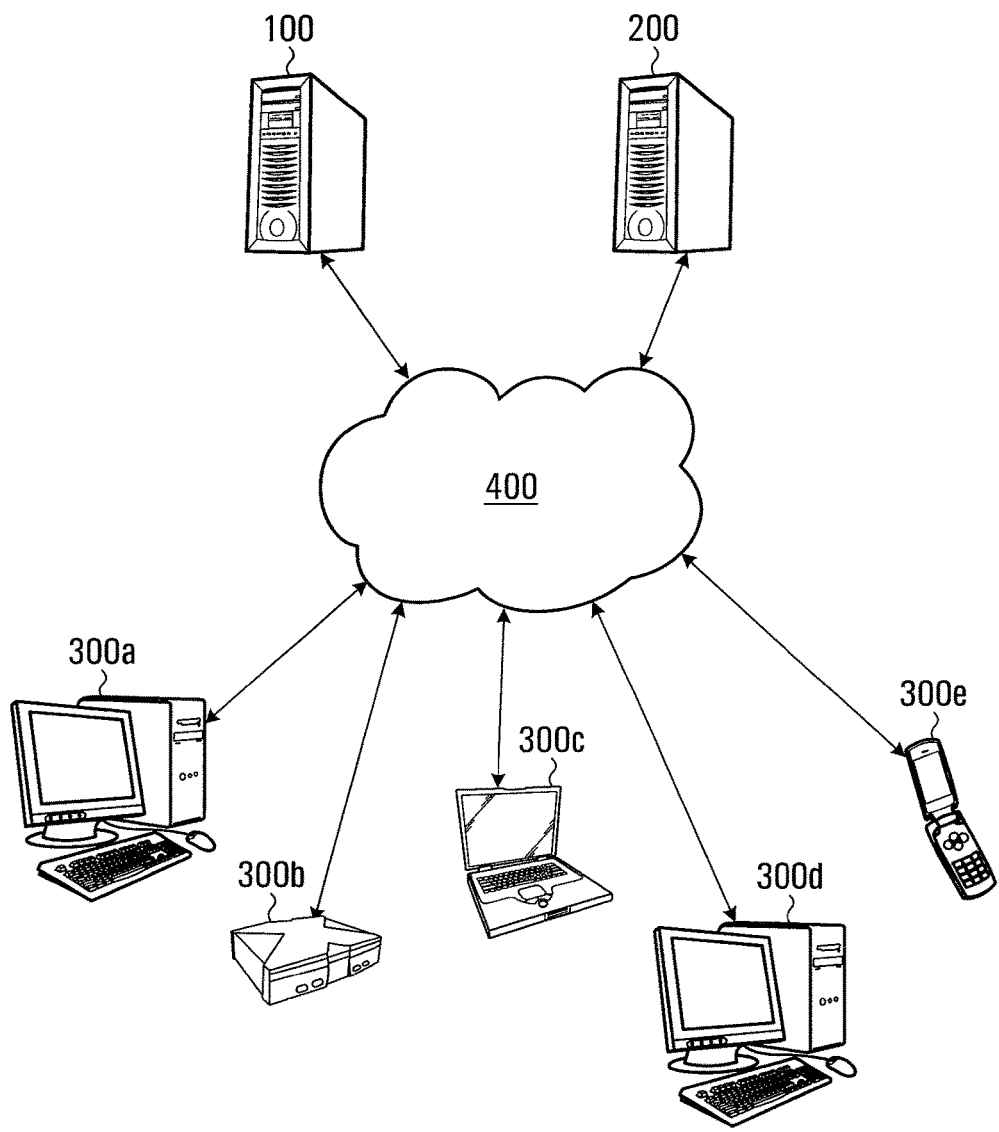
FIG. 1 is a block diagram of a system including a central server and a rendering server, according to a non-limiting embodiment of the present invention.

FIG. 1 shows a cloud computing architecture 10 according to an embodiment of the present invention. The cloud computing architecture 10 includes a server system for providing a service to one or more client devices 300a to 300e. In the following description, the expression "the client device 300" (or "the client devices 300") refers to any or all of the client devices 300a to 300e unless otherwise specified. In a non-limiting embodiment, the cloud computing architecture 10 is a video game architecture and the "service" provided by the server system can be a single-player or a multi-player video game. It should be understood that a video game includes games that are played purely for entertainment as well as games played with the possibility of monetary gain (gambling).

In some embodiments, one or more of the client devices 300 can be, for example, a PC, home game machine (console such as XBOX™, PS3™, Wii™) or portable game machine. In other embodiments, one or more of the client devices 300 may be a communication or computing device such as a cell phone, PDA, or tablet (e.g., iPad™). The client devices 300 have input devices, such as a touch screen, keyboard, game controller, joystick, etc., to allow users of the client devices 300 to provide input and participate in the game. In other embodiments, the user of a given one of the client devices 300 may produce body motion or wave an external object; these movements are detected by a camera or other sensor (e.g., Kinect™), while software operating within the client device attempts to correctly guess whether the user intended to provide input to the client device and, if so, the nature of such input.

In a non-limiting embodiment, the server system comprises a central server 200 and a rendering server 100, although in other non-limiting embodiments, the server system can comprise one or more clusters of one or more servers per cluster. The servers in the server system, such as the central server 200 and the rendering server 100, may communicate through a network 450 such as, for example, a dedicated private network, data center, or a virtual private network (VPN). The network 450 may ideally be a low-latency network.

The central server 200 (which may also be referred to as a game state server) receives input signals 20 from the client devices 300a to 300e. The input signals 20 can be received from the various client devices 300a to 300e through a back channel over a network 400, such as a public data network (e.g., the Internet) or a private IP network. The input signals 20 can be the result of the client devices 300a to 300e detecting user actions, or they can be generated autonomously by the client devices 300a to 300e themselves. The input signal 20 from a given client device can convey that the user of the client device wishes to cause the character under his control to move, jump, kick, turn, swing, pull, grab, etc. Alternatively or in addition, the input signal 20 from a given client device can convey that the user of the client device wishes to select a particular camera view (e.g., first-person or third-person).

The rendering server 100 is configured for rendering game screens for the client devices 300a to 300e, based on commands/instructions received from the central server 200. These commands can be transmitted from the central server 200 to the rendering server 100 in the form of packets 40 over the network 450. Output signals 30 containing the rendered game screens are distributed by the rendering server 100 to the client devices 300 over the network 400, such as the Internet. In some embodiments, it may be possible to establish a low-latency, high-bandwidth channel between the central server 200 and the rendering server 100 over the network 400, in which case the networks 450, 400 could utilize the same physical resources. In other embodiments, the networks 450, 400 are separate networks and traverse separate physical paths.

Different game screens are produced for different client devices 300 depending on their location in the game, camera angle and other game parameters. Of interest is the fact that a client device 300 need not have any rendering functionality for displaying a game screen. That is, each of the client devices 300 need only be an apparatus including a user interface for detecting input and comprising (or connectable to) a display device for displaying a received and rendered game screen. Since generating a game screen uses more hardware resources than those to be used by a process of decoding a video stream, the present system enables users to participate in a game independent of the rendering performance of a client device 300 by transmitting already-rendered game screens from the rendering server 100 to the client device 300.

b. Central Server

Figure 2:
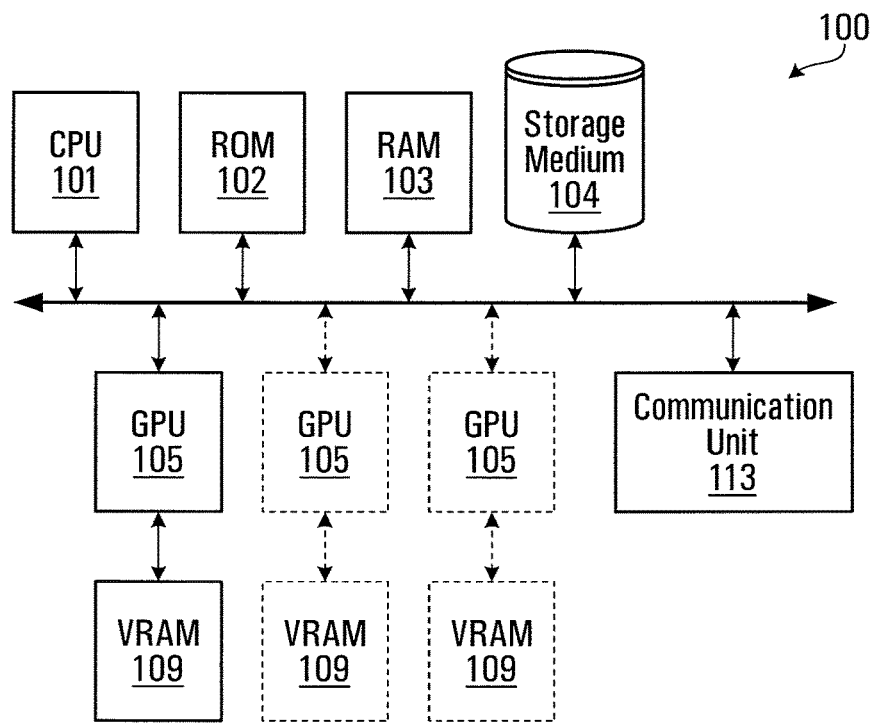
FIG. 2 is a block diagram showing various functional modules of the central server, according to a non-limiting embodiment of the present invention.

Various functional modules that make up the central server 200 of this embodiment will now be explained with reference to FIG. 2. A central CPU 201 controls the operation of each module of the central server 200. More specifically, the CPU 201 reads out program instructions from, for example, a ROM 202 or central storage medium 204. The CPU 201 expands the program instructions into a central RAM 203 and executes the program, thereby carrying out a "game state management process" and controlling the operation of various other modules in the central server 200.

The central ROM 202 can be, for example, a programmable non-volatile memory. The central ROM 202 stores program instructions for the game state management process, and may also store other program instructions. The central ROM 202 also stores information such as data required for the operation of each module of the central server 200.

The central RAM 203 can be a volatile memory. The central RAM 203 is used not only as an expansion area for the game state management process operation program, but also as a storage area for temporarily storing, for example, intermediate data output during the operation of other modules of the central server 200.

The central storage medium 204 can be, for example, a mass storage device such as an HDD detachable from the central server 200. In this embodiment, the central storage medium 204 is used as, for example, a database for managing participants involved the game, and a database for managing various kinds of information on the game, which are required to generate a game screen to be provided for each participant in the game.

The central communication unit 205 is a communication interface of the central server 200. The central communication unit 205 receives input signals 20 from the client devices 300 over the network 400. The central communication unit 205 also sends packets 40 to the rendering server 100 over the network 450. When necessary or appropriate, the central communication unit 205 may convert data into a data format complying with various communication specifications.

It should be appreciated that as used herein, the term "participant" refers to both "players" and "spectators", wherein "players" are typically assigned a character over which they exert some control during game play and "spectators" can typically view players' movements from a location of their choice without having control over game play.

c. Rendering Server

Figure 3:
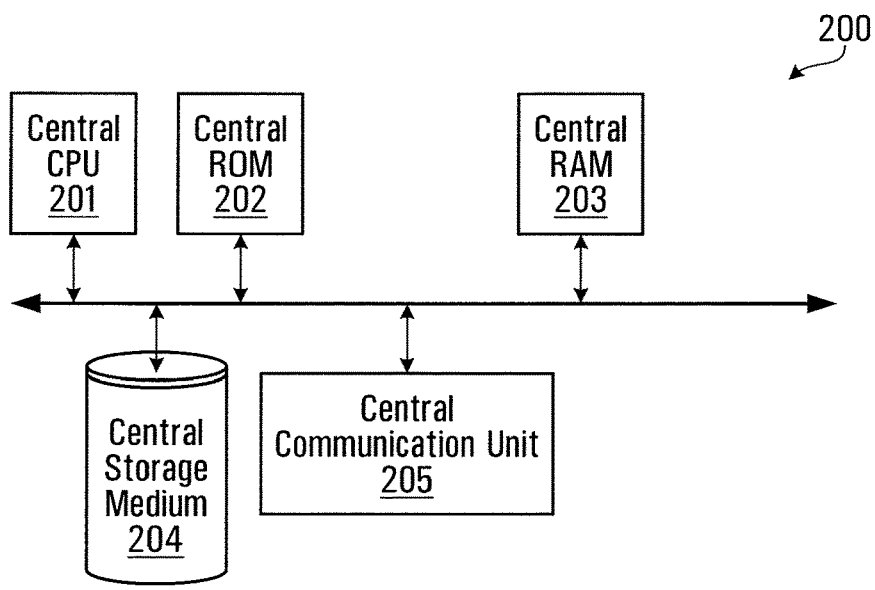
FIG. 3 is a block diagram showing various functional modules of the rendering server, according to a non-limiting embodiment of the present invention.

FIG. 3 is a block diagram showing various functional modules of the rendering server 100 according to a non-limiting embodiment of the present invention. A CPU 101 controls the operation of various modules of the rendering server 100. More specifically, the CPU 101 reads out program instructions stored in a ROM 102 or storage medium 104, expands the program instructions on a RAM 103, and executes the program, thereby carrying out a "rendering control process" and controlling the operation of each module.

The ROM 102 is, for example, a programmable nonvolatile memory. The ROM 102 stores the program instructions for the rendering control process, other program instructions, and information such as data required for the operation of each module of the rendering server 100.

The RAM 103 can be a volatile memory. The RAM 103 is used not only as an operation program expansion area, but also as a storage area for temporarily storing, for example, intermediate data output during the operation of each module of the rendering server 100. The storage medium 104 can be, for example, a mass storage device such as an HDD detachable from the rendering server 100.

A communication unit 113 is a communication interface of the rendering server 100. The communication unit 113 exchanges data with other apparatuses. For example, the communication unit 113 receives packets 40 from the central server 200 over the network 450. The communication unit 113 converts data received across the network 450 into an arbitrary data format readable by the rendering server 100, and temporarily stores the data in, for example, the RAM 103. In addition, the communication unit 113 sends rendered game screens to the client devices 300 over the network 400. When transmitting data to a transmission destination apparatus (such as one of the client devices 300), the communication unit 113 converts the data into a data transmission format compatible with the network 400 or a transmission destination apparatus, and transmits the data to the transmission destination apparatus.

d. Graphics Processing Units

Game screens to be provided for the client devices 300 are generated by one or more graphics processing units (GPUs) 105 within or accessible to the rendering server 100. Each GPU 105 is connected to a video memory 109 (e.g., VRAM), which provides a rendering area for the game screen. When performing rendering on the connected VRAM 109, each GPU 105 expands an object in a cache memory (not shown), and writes the mapped object in the corresponding VRAM 109. Note that one video memory 109 is connected to one GPU 105 in this embodiment, but the present invention is not limited to this. That is, the number of video memories 109 connected to the GPU 105 can be any arbitrary number.

It is to be noted that, depending on processing power (which can be related to the number of GPUs it operates), the rendering server 100 may be capable of simultaneously generating a plurality of game screens for a plurality of participants.

The GPUs 105 are controlled by providing them with rendering instructions (also referred to as "rendering commands"). Interaction with the GPUs 105 can be achieved through a low-level API in order to draw triangles, lines, or points per frame, or to start highly parallel operations on the GPUs 105. The low-level API hides different GPU implementations behind a coherent abstraction. One non-limiting example of a low-level API is Direct3D™, available from Microsoft Corporation of Redmond, Wash. Generally speaking, supplying a rendering command to a GPU amounts to calling a function to be executed by the GPU.

Examples of detailed data that may be part of a rendering command used to render a particular object may include one or more of: model data; texture data; the identity of a rendering program (for example, a shader) to be used; and data for calculations (for example, the light source intensity, light source vector, and rotation matrix) to be used by the rendering program. Of course, a rendering command may contain other information used in the process of rendering an object.

The rendering of a game screen for a particular participant may require the execution of hundreds or thousands of rendering instructions. Once a game screen has been rendered for a particular participant, the game screen is provided by the rendering server 100 to the client device 300 associated with the particular participant. Thus, the system 10 of the present embodiment can generate game screens corresponding to inputs provided at the various client devices 300 at a rate of several times (e.g., 30 or 60) per second for each participant. These game screens are displayed to the corresponding participants via the display device of each participant's client device 300. At this rate, the human eye will perceive fluidity of motion.

Although the system 10 of the present non-limiting embodiment includes one rendering server 100 and one central server 200, the present invention is not limited to this specific arrangement. For example, it is possible to allocate one rendering server 100 to a plurality of central servers 200, or to allocate a plurality of rendering servers 100 to a plurality of central servers 200. The central server 200 can also designate a rendering server 100 or a GPU of a rendering server 100 to be used to execute a rendering instruction, in accordance with information indicating the number of game screens simultaneously generated by a rendering server 100 or each GPU of a rendering server 100.

e. Game State Management Process

Figure 4:
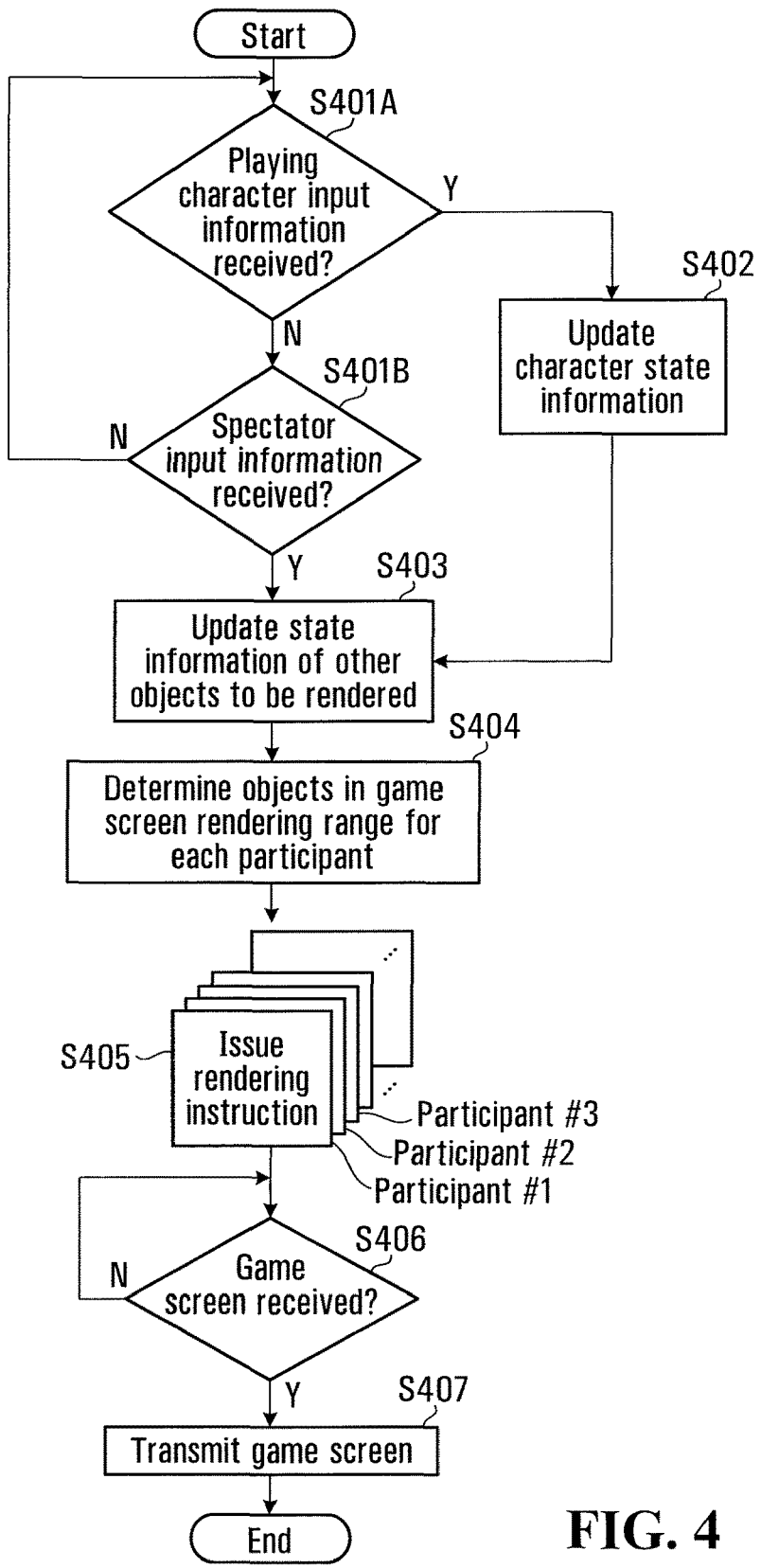
FIG. 4 is a flowchart illustrating steps in a game state management process executed by the central server.

A non-limiting example of execution of the game state management process by the central server 200 will be explained below with reference to the flowchart shown in FIG. 4. The game state management process for a given participant is spawned when that participant's client device 300 connects to the central server 200. The game state management process for the given participant includes a main loop that is executed for each frame, namely several (e.g., 30 or 60) times per second. As part of the main loop, the central server 200 receives participant input 30 via the client devices 300 (step S401), modifies game state information (step S403), determines the objects in the "game screen" for the given participant (S404) and generates function calls to the GPUs 105 (step S405). This is now described in greater detail.

In executing the game state management process, the central server 200 manages information pertaining to characters operated by the players (such as their position and direction on a map) and also manages events associated with each character and with the game as a whole. For example, when a given player provides an input to his or her client device 300, this information is transmitted across the network 400 to the central server 200 which, in executing the game state management process, updates the information pertaining to the given player's character. Also as part of the game state management process, the central server 200 causes the rendering server 100 to generate a game screen for each participant. Specifically, the central server 200 determines one or more objects to be rendered on the game screen for each participant, and transmits a set of rendering instructions (possibly thousands per frame) to the rendering server 100.

Turning now to step S401, input information may be received from the client device 300 associated with the given participant or from the client device 300 associated with one or more other players or spectators. The input information may indicate that the players or spectators have carried out an operation on their characters via their client device. The input information may have a data structure, a non-limiting example of which is shown in FIG. 5A. For instance, the data structure may contain one or more of: an identifier (for example, an IP address and user identification information) of a client device at which an operation by a player or spectator has been carried out; movement information, including magnitude and direction; identification information of a selected action; rendering range of a game screen (for example, a camera parameter); and/or the display setting (for example, the screen display resolution and the number of colors) of the display device connected to the client device. It is to be noted that the data structure of the input information received by the central server 200 is not limited to the foregoing.

In one non-limiting embodiment, the input information can be a set of numerical values obtained by converting an operation effected on the client device 300 by the player or spectator into numerical values/parameters. In other embodiments, the input information may include an input signal detected by the client device 300 (e.g., in response to pressing a button or the like by the player or spectator), in which case the process of conversion into numerical values/parameters can be performed by the central CPU 201, as a function of the type of client device 300 from which it was received.

At step S403, an update to the playing characters, non-playing characters and other graphical elements is performed. Examples of other graphical elements include background objects such as a landform. The objects to be rendered can change with time in accordance with game rules, or by the action of a character as controlled by the corresponding player.

In summary, therefore, the central CPU 201 reads out, from the central storage medium 204, state information corresponding to each character or graphical element in the game that was affected by the input information, clock information or other information. In the case of character state information, this may include information pertaining to the appearance and properties of a character that can be changed by a player's operation, such as, for example, the position (coordinate information) of the character on the map, the gazing direction of the character, and the character's action. Based on the input information, a parameter pertaining to the character is updated. Accordingly, the actions carried out by the players can be reflected on the characters in the game.

At step S404, objects in the "game screen rendering range" for the given participant are determined. The game screen rendering range can include a set of coordinates (e.g., in two or in three dimensions) that delimits the set of objects contained in the game screen for that participant. The objects contained in the game screen for a given participant will vary from one participant to the next.

More specifically, the central CPU 201 reads out, from the central storage medium 204, the game screen rendering range for the given participant's client device 300. The game screen rendering range contains, e.g., camera parameters corresponding to the game screen. The central CPU 201 refers to the camera parameters, and specifies, as a rendering object contained in the game screen, a rendering object such as a character whose state information contains coordinate information included in the camera's rendering range. Note that an identifier is assigned to each object to be rendered, and the central CPU 201 associates the object identifier with the client device identifier, and records the information on the central storage medium 204.

At step S405, the game state management process generates rendering instructions for rendering the objects in the given participant's game screen. As shown by the data structure in FIG. 5B, the rendering instructions issued by the game state management process for a particular client device 300 may include one or more of: an identifier of each object contained in the game screen; detailed information regarding each object contained in the game screen; state information regarding each object contained in the game screen; and information regarding the rendering range and display setting of the game screen.

It is to be noted that if the game is, for example, a game in which the camera position remains unchanged or a game having a fixed display resolution, information such as the camera parameters and display setting indicating the game screen rendering range need not be contained in the rendering instruction.

f. Remote Procedure Calls

It will be noted that the rendering instructions generated at step S405 of the game state management process executed by the CPU 201 of the central server 200 are issued as function calls destined for one or more of the GPUs 105, which are on the rendering server 100. This can be achieved by virtue of remote procedure calls, whereby a local device (the central server 200) calls one or more functions at a remote device (the rendering server 100). Such remote procedure calls are carried out several hundred or thousand times per frame, for each of the client devices 300.

Figure 6:
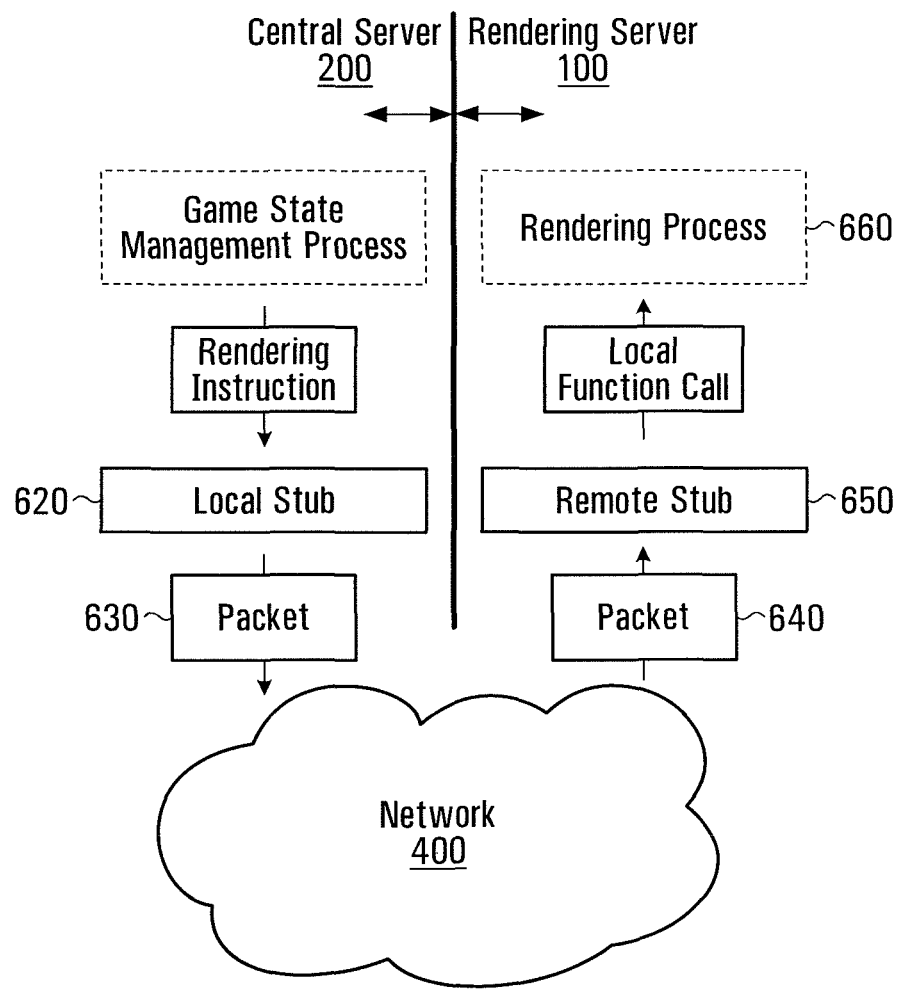
FIG. 6 conceptually illustrates a remote procedure call and the functional entities involved therein, according to a non-limiting example embodiment.

FIG. 6 conceptually illustrates a remote procedure call and the functional entities involved therein, according to a non-limiting example embodiment. With reference to FIG. 6, there is provided a local stub 620, which can be embodied as a software routine/procedure that is invoked either implicitly or explicitly by the game state management process upon issuing one or more rendering instructions 610. For example, whereas the game state management process may operate at a first level of the OSI model (e.g., the application layer), the local stub 620 may operate at a lower level of the OSI model (e.g., the presentation layer). When the one or more rendering instructions 610 is issued at step S405 and its associated data is pushed onto the stack, this is recognized by the local stub 620. Alternatively, the local stub 620 can be invoked by operating system.

The local stub 620 assembles the data associated with the one or more rendering instructions 610 into a packet 630 and makes a low-level system call to send the packet 630. Assembling the data associated with the rendering instructions into the packet 630 is called "marshalling", and will be described in further detail later on. The operating system of the central server 200 releases the packet 630 from the central server 200 (which can be viewed as the "local" device) into the network 450 towards the rendering server 100 (which can be viewed as the "remote: device).

At the rendering server 100, the operating system of the rendering server 100 passes the incoming packet 640 (whose contents may be identical to those of packet 630) to a remote stub 650, which is part of the rendering control process running on the CPU 101. The remote stub 650 disassembles the parameters from the packet 640. Disassembly of the parameters is called "unmarshalling", and will be described in further detail later on. This results in the one or more rendering instructions 630 being reconstructed. Finally, the remote stub 650 sends the rendering instructions to the GPUs 105 on the rendering server 100. To this end, the remote stub 650 locally makes the various API calls corresponding to the rendering instructions.

When a complete game screen for the given participant has been rendered on the rendering server 100, the rendering control process sends the rendered game screen to the client device 300 corresponding to that participant. The game screen may comprise a frame of video, which can be encoded into a suitable format for delivery to the client device 300 over the network 400. The video frame may also include audio as well as other information including control information.

In some cases, it may be the case that within a series of rendering instructions issued by the game state management process for a given participant, some of these rendering instructions will be similar or identical. The same may be true of other instructions that trigger remote procedure calls. In accordance with some non-limiting embodiments of the present invention, the remote procedure calls can be made more efficient by compressing or condensing them. Specifically, the local stub 620 can be specially adapted to carry out a marshalling process that leads to the generation of condensed packets 40. At the rendering server side, the remote stub 650 can be specially adapted to carry out a unmarshalling process for expanding received packets that have been condensed.

g. Marshalling

In a non-limiting embodiment, the local stub 620 in the central server 200 executes a marshalling process. Generally speaking, as part of the marshalling process, an instruction to be executed by the remote device is obtained. Following this, a packet representing the instruction is created and released towards the remote device. Creation of the packet involves consulting a memory to determine whether a "packet index" has already been assigned to the instruction. If this is the case, the packet is formulated so that it contains the packet index. Since fewer bits are needed to encode the packet index than to encode the instruction, the packets generated by the marshalling process will have a tendency to be condensed when they repeatedly represent the same instruction.

Figure 7A:
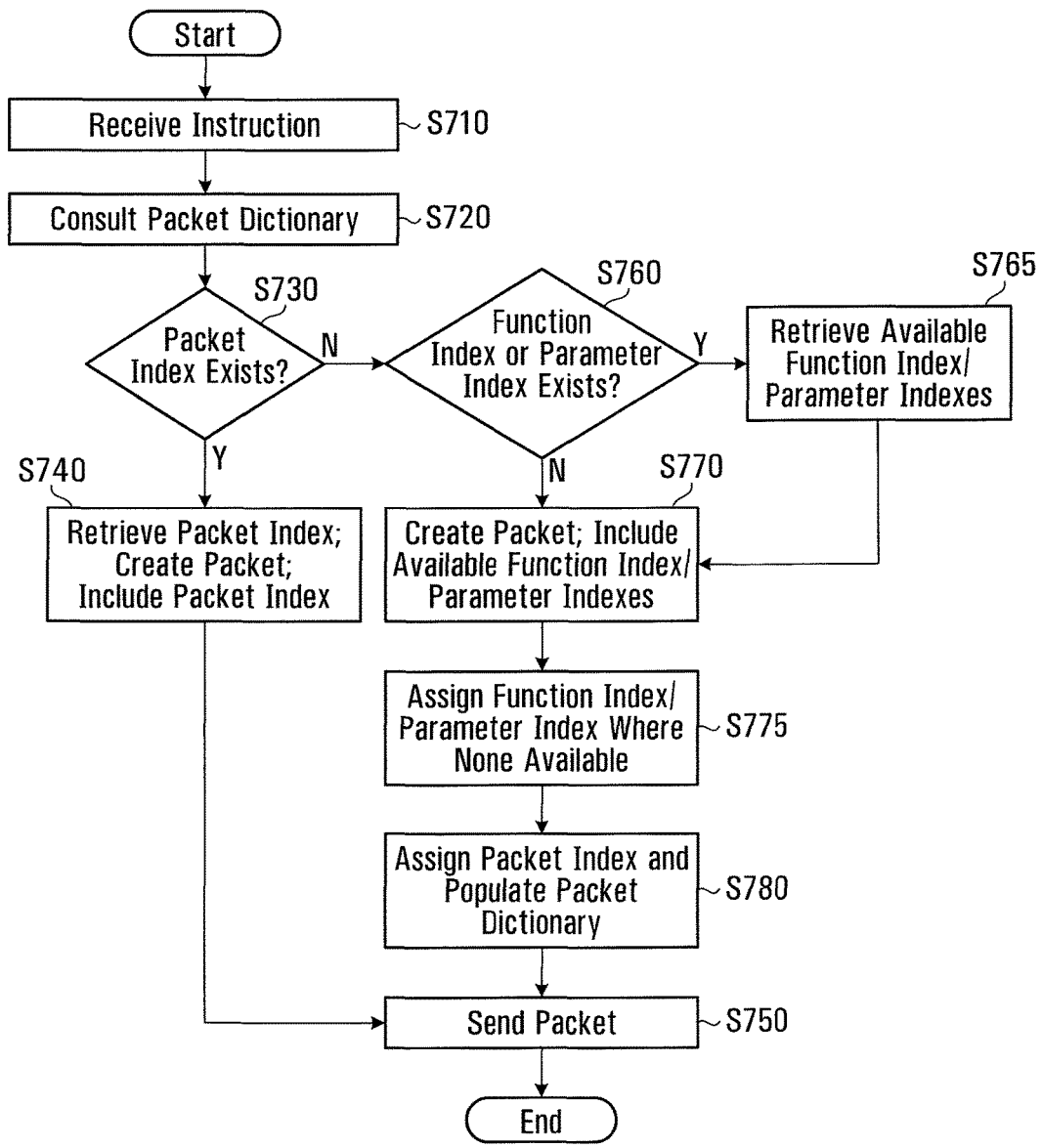
FIG. 7A is a flowchart representative of steps in a marshalling process, in accordance with a non-limiting embodiment of the present invention.

Reference is made to FIG. 7A, which shows a flowchart representative of steps in a marshalling process for generating condensed packets to be sent to a remote device, in accordance with a non-limiting embodiment of the present invention. At step S710, an instruction is received. In a non-limiting example, the instruction may be a rendering instruction issued by a game state management process at the application layer. Those skilled in the art will appreciate that the instruction can be formatted in numerous ways. For example, the instruction may be formatted as a function call, such as:

Functioncall(Param1, Param2, Param3, Data).

It will be seen that the instruction includes at least a "function identifier" (Functioncall) and a combination of "parameters" (Param1, Param2, Param3). The function identifier represents a function to be executed remotely by the remote device (e.g., the rendering server 100). The function identifier (Functioncall) is considered to be condensable, which means that the marshalling process will favor using a function index, rather than the function identifier, to encode the function to be executed by the remote device. This will result in fewer bits being used to encode the same function.

The combination of parameters (Param1, Param2, Param3) represent function arguments that are also considered to be condensable. This means that the marshalling process will favor using a parameter indexes, rather than the parameters themselves, to represent the function arguments. Examples of function arguments that are condensable include the names of pointers, addresses and variables.

Optionally, the instruction can also include function arguments (e.g., Data) that are not considered to be condensable. The demarcation between function arguments that are considered to be condensable those which are not considered to be condensable may be different in different embodiments. For example, in some embodiments, the values acquired by pointers, addresses and variables are considered to be condensable, whereas in other embodiments, these same values would not considered incondensable.

Figures 7B, 7C:
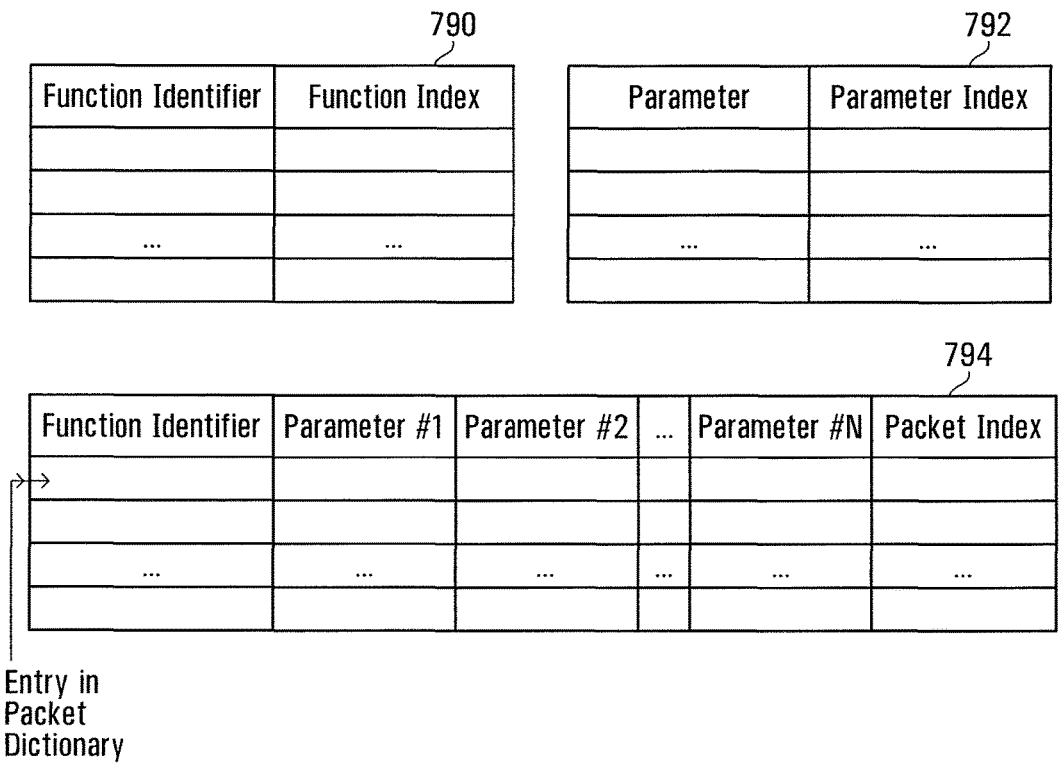
FIG. 7B shows various mappings used in the marshalling process, including a function index table, a parameter index table and a packet dictionary, in accordance with a non-limiting embodiment of the present invention.
FIG. 7C shows a parameter combination index table that may be used in some non-limiting embodiments of the present invention.

Referring now to FIG. 7B, there is shown a function index table 790 and a parameter index table 792. The function index table 790 associates function identifiers with respective function indexes, and is accessed on the basis of a received function identifier. Similarly, the parameter index table 792 associates parameters with respective parameter indexes, and is accessed on the basis of a received parameter. In addition, there is shown a packet dictionary 794. The packet dictionary 794 associates specific function calls involving specific combinations of parameters to respective packet indexes. That is to say, each entry in the packet dictionary 794 associates a function identifier and a combination of parameters to a particular packet index. There may be a maximum number of parameters N in a combination of parameters that may be listed in the packet dictionary 794.

In one non-limiting embodiment, the function index table 790, the parameter index table 792 and the packet dictionary 794 may be implemented as databases that are maintained in the central RAM 203 or the central storage medium 204. In another non-limiting embodiment, the function index table 790, the parameter index table 792 and the packet dictionary 794 can be maintained on external storage, which is accessible to the central server 200 via a local storage area network (SAN), the network 450 or the network 400. Still other possibilities will be apparent to those of skill in the art.

At step S720, the packet dictionary 794 is checked. In particular, the current set of function identifier and combination (i.e., ordered set) of parameters is compared against the entries of the packet dictionary 794 to determine whether the packet dictionary 794 includes a packet index for the current set of function identifier and combination of parameters. If the answer is affirmative, this will indicate that a packet representing the same function and the same combination has already been created and transmitted to the remote device (e.g., the rendering serve 100). In that case, the marshalling process proceeds to step S740, wherein the existing packet index is retrieved from the packet dictionary 794, and a packet is formulated such that it includes the packet index. In addition, function arguments (e.g., certain forms of data) that are not considered to be condensable may be appended to the packet.

The marshalling process then proceeds to step S750, wherein the newly created packet is transmitted to the remote device (e.g., the rendering server 100) over the network 450. The packet also includes any necessary header or other information that would make it suitable for transmission over the network 450. For example, the packet may be formatted in such a way as to alert the remote device that it carries a packet index rather than the function identifier or the parameters themselves.

However, if at step S720 it had been determined that the packet dictionary 794 does not include a packet index for the current set of function identifier and combination of parameters, the marshalling process proceeds to step S760. At step S760, the function index table 790 and the parameter index table 792 are checked. In particular, it is determined whether the function index table 790 includes a function index for the function identifier. If the answer is affirmative, this will indicate that the same function has been called in the past, although with different parameters (or with the same parameters but in a different order). It is also determined whether the parameter index table 792 includes a parameter index for one or more of the parameters. If the answer is affirmative for a given parameter, this will indicate that the given parameter has been part of a function call in the past. Accordingly, at step S765, the previously assigned/allocated function index and/or parameter index(es) is(are) retrieved.

The marshalling process then proceeds to step S770, where a packet is formulated such that it includes any previously assigned function index and/or parameter index(es) that was(were) retrieved at step S765. In addition, function arguments that are not considered to be condensable may be appended to the packet.

If there was no function index retrieved at step S765, then the complete function identifier is used in the packet. In addition, a step S775, an entry for the function identifier is created in the function index table 790 and a function index is assigned to the function identifier and stored in association therewith. Assignment of the function index to the function identifier may proceed in accordance with a function index assignment algorithm that is known to both the local device and the remote device. If this is the case, then it is not necessary to inform the remote device of the function index assigned to the function identifier, because the remote device can derive the function index by executing the same function index assignment algorithm as the local device. However, if the function index assignment algorithm is not known to both the local device and the remote device, then it may be desirable to include, in the packet, not only the complete function identifier, but also the function index associated therewith.

Similarly, if, for at least one of the parameters, there was no parameter index retrieved at step S765, then the complete parameter is used in the packet. In addition, at step S780, an entry for each such parameter is created in the parameter index table 792 and a parameter index is assigned to the parameter and stored in association therewith. Assignment of parameter indexes to parameters may proceed in accordance with a parameter index assignment algorithm that is known to both the local device and the remote device. If this is the case, then it is not necessary to inform the remote device of the parameter index assigned to a given parameter, because the remote device can derive the parameter index by executing the same parameter index assignment algorithm as the local device. However, if the parameter index assignment algorithm is not known to the remote device, then when including a complete parameter in the packet, it may also be desirable to include the parameter index associated therewith.

The marshalling process further executes step S750, wherein the packet is transmitted to the remote device (e.g., the rendering server 100) over the network 450. This can be done by placing the packet in an output queue of the central communication unit 205. The packet also includes any necessary header or other information that would make the packet suitable for transmission over the network 450.

It should be understood that the creation of entries in the function index table 790 and the parameter index table 792 (i.e., the execution of steps S775 and S780) can occur prior to, during or after execution of step S750.

h. Marshalling (Example)

An example description will now be provided in order to illustrate operation of the marshalling process in the creation of three packets from the following three successive instructions:

Functioncall_1(Param1, Param2, Param3);
Functioncall_2(Param3, Param4);
Functioncall_1(Param1, Param2, Param3).

It will be noted that the first and third instructions utilize the same function identifier Functioncall_1 and the same function arguments Param1, Param2 and Param3. It is assumed that all function arguments are condensable, and therefore qualify as "parameters". However, this assumption is made merely for the sake of simplicity and it need not be the case in every embodiment.

Figure 8A:
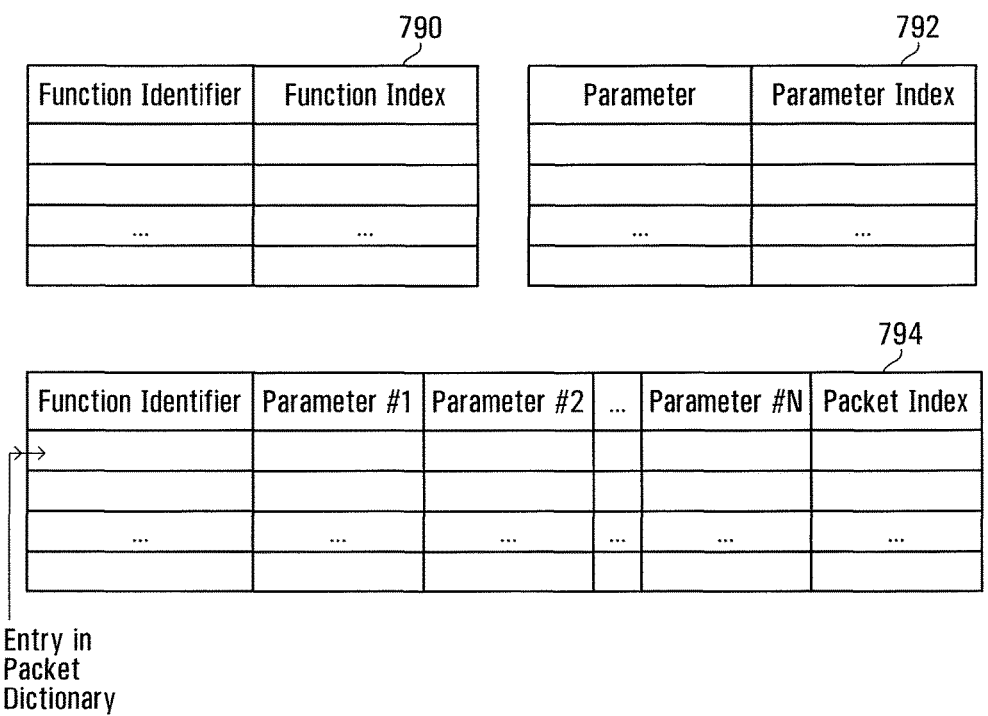
FIG. 8A conceptually illustrates the state of the function index table, the parameter index table and the packet dictionary, prior to processing a first of three example instructions, in accordance with a non-limiting embodiment of the present invention.

FIG. 8A shows the status of the packet dictionary 794, the function index table 790 and the parameter index table 792 prior to receipt or processing of the first instruction Functioncall_1 (Param1, Param2, Param3). Quite simply, the packet dictionary 794, the function index table 790 and the parameter index table 792 are all empty.

Figure 8B:
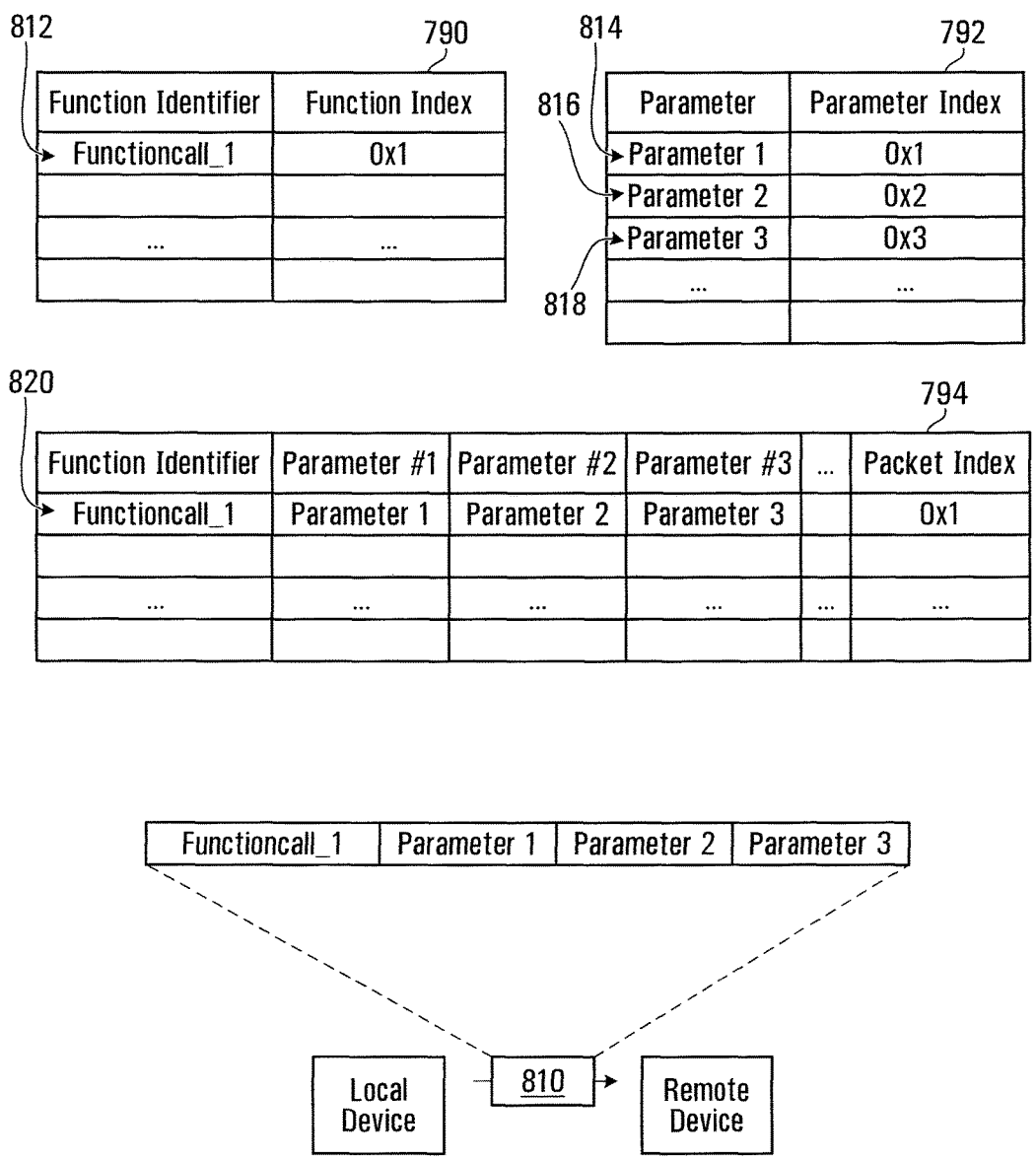
FIG. 8B conceptually illustrates the state of the function index table, the parameter index table and the packet dictionary, after processing the first instruction, as well as the resulting packet, in accordance with a non-limiting embodiment of the present invention.

Consider now three iterations of the marshalling process, as executed on the first, second and third aforementioned instructions, respectively. The first iteration of the marshalling process begins at step S710, whereby the first instruction Functioncall_1 (Param1, Param2, Param3) is received. The function identifier is Functioncall_1 and the combination (ordered set) of parameters is Param1, Param2, Param3. The packet dictionary 794 is consulted at step S720, and it is determined that there is no entry in the packet dictionary 794 for the current function identifier (Functioncall_1) and the current combination of parameters (Param1, Param2, Param3). Next, at step S760, the function index table 790 and the parameter index table 792 are checked. These are also empty, and therefore the marshalling process continues to step S770. This results in the creation of a packet which, as illustrated in FIG. 8B, is denoted 810 includes function identifier Functioncall_1 and parameters Param1, Param2 and Param3, the order of which is preserved.

At step S775, which may be executed before, during or after step S770, an entry 812 is created in the function index table 790 for function identifier Functioncall_1, and a function index 0x1 is assigned to function identifier Functioncall_1 and stored in the newly created entry 812. In addition, three entries 814, 816, 818 are created in the parameter index table 792, one each for Param1, Param2 and Param3, and parameter indexes 0x1, 0x2 and 0x3 are assigned to parameters Param1, Param2 and Param3 and stored in the respective newly created entries 814, 816, 818. Furthermore, at step S780, which may also be executed before, during or after step S770, a new entry 820 is created in the packet dictionary 794 for the function identifier Functioncall_1 together with the combination of parameters Param1, Param2, Param3, to which a packet index 0x1 is assigned.

At step S750, packet 810 is released towards the remote device. Optionally, although not shown in the drawing, packet index 0x1 may be included in packet 810, while function index 0x1 may accompany function identifier Functioncall_1 and parameter indexes 0x1, 0x2 and 0x3 may accompany parameters Param1, Param2 and Param3 in packet 810. Providing this additional information may assist the remote device in replicating its own versions of the packet dictionary 794, the function index table 790 and the parameter index table 792, particularly when the remote device is not aware of the algorithm/process used by the local device to generate the packet index, the function index and the parameter indexes.

The second iteration of the marshalling process begins at step S710, whereby the second instruction Functioncall_2 (Param3, Param4) is received. The function identifier is Functioncall_2 and the combination (ordered set) of parameters is Param3, Param4. The packet dictionary 794 is consulted at step S720, and it is determined that there is no entry in the packet dictionary 794 for the current function identifier and combination of parameters. Next, at step S760, the function index table 790 and the parameter index table 792 are checked. The function index table 790 does not include an entry for function identifier Functioncall_2. However, while the parameter index table 792 does not include an entry for parameter Param4, it does include and entry for parameter Param3. Accordingly, the marshalling process proceeds to step 765, where parameter index 0x3 is retrieved in association with parameter Param3.

Figure 8C:
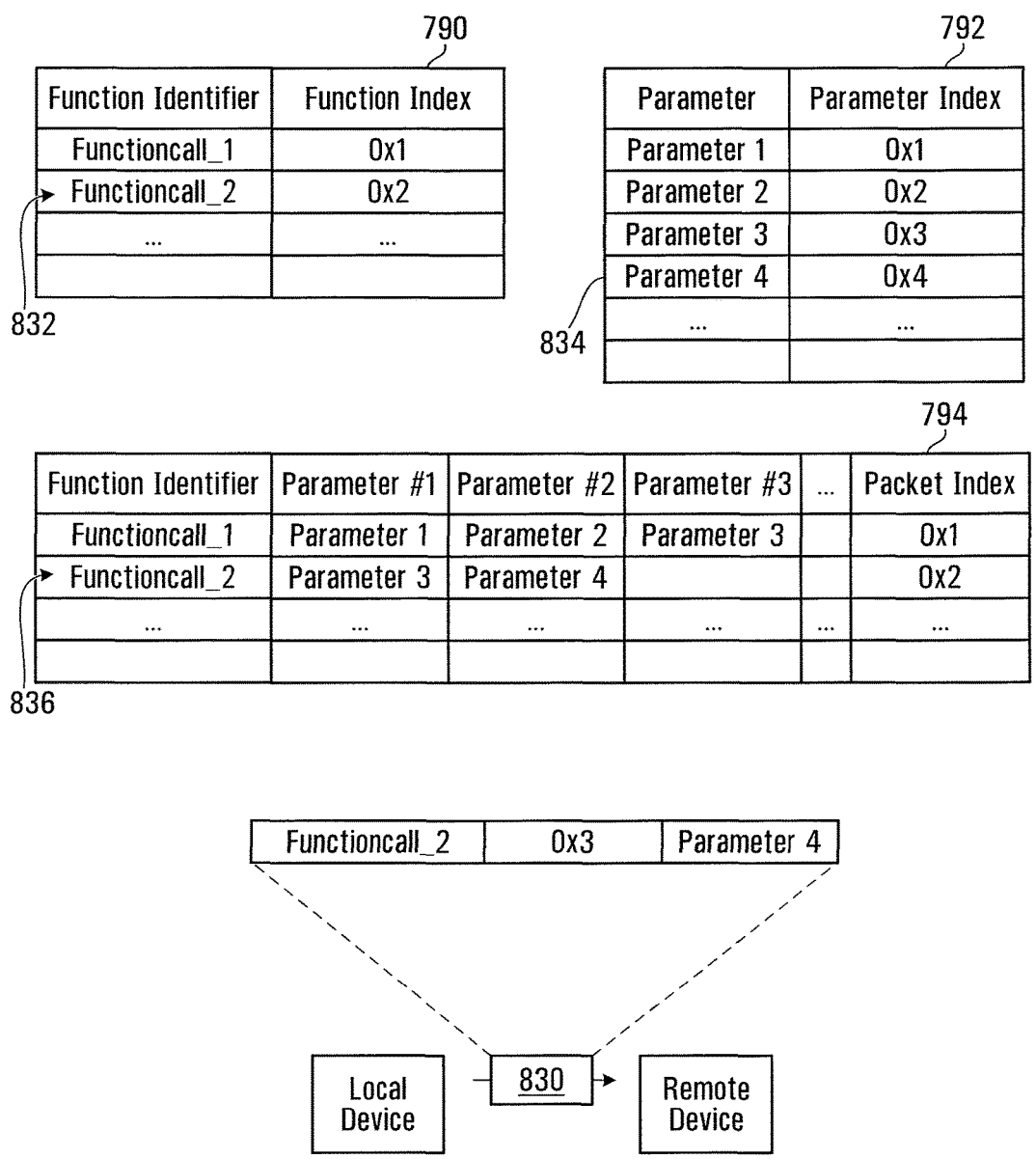
FIG. 8C conceptually illustrates the state of the function index table, the parameter index table and the packet dictionary, after processing the second of three example instructions, as well as the resulting packet, in accordance with a non-limiting embodiment of the present invention.

With reference to FIG. 8C, the marshalling process continues to step S770, where a packet 830 is created, and includes function identifier Functioncall_2, parameter index 0x3 (in lieu of parameter Param3) and parameter Param4. A flag may be inserted into packet 830 in order to differentiate between fields that convey a parameter versus fields that convey a parameter index. At step S775, which may be executed before, during or after step S770, an entry 832 is created in the function index table 790 for function identifier Functioncall_2, and a function index 0x2 is assigned to function identifier Functioncall_2 and stored in the newly created entry 832. In addition, an entry 834 is created in the parameter index table 792 for Param4, and parameter index 0x4 is assigned thereto and stored in the newly created entry 834. Furthermore, at step S780, which may also be executed before, during or after step S770, a new entry 836 is created in the packet dictionary 794 for the function identifier Functioncall_2 together with the combination of parameters Param3, Param4, to which a packet index 0x2 is assigned.

At step S750, packet 830 is released towards the remote device. Optionally, although not shown in the drawing, packet index 0x2 may be included in packet 830, while function index 0x2 may accompany function identifier Functioncall_2 and parameter index 0x4 may accompany parameter Param4 in packet 830. This additional information may assist the remote device in replicating its own versions of the packet dictionary 794, the function index table 790 and the parameter index table 792.

It is noted that because packet 830 includes parameter index 0x3 instead of parameter Param3, packet 830 is shorter in length than it would have been, had it included parameter Param3 in fully expanded (uncondensed) form. That is to say, packet 830 is condensed, which means that it takes less time to transmit and consumes less bandwidth through the network 450. Transmission efficiency thus increases as a result of the present marshalling process.

Moreover, as the number of transmitted packets increases, so does the transmission efficiency. This demonstrated by considering the third iteration of the marshalling process, which begins at step S710 upon receipt of the third instruction Functioncall_1 (Param1, Param2, Param3). The function identifier is Functioncall_1 and the combination (ordered lit) of parameters is Param1, Param2, Param3. The packet dictionary 794 is consulted at step S720. By virtue of earlier execution of step S780 in connection with the first iteration of the marshalling process, the will have been created an entry in the packet dictionary 794 for the current function identifier and combination of parameters. Specifically, this is entry 812, which associates packet index 0x1 with function identifier Functioncall_1 and the combination of parameters Param1, Param2, Param3.

Figure 8D:
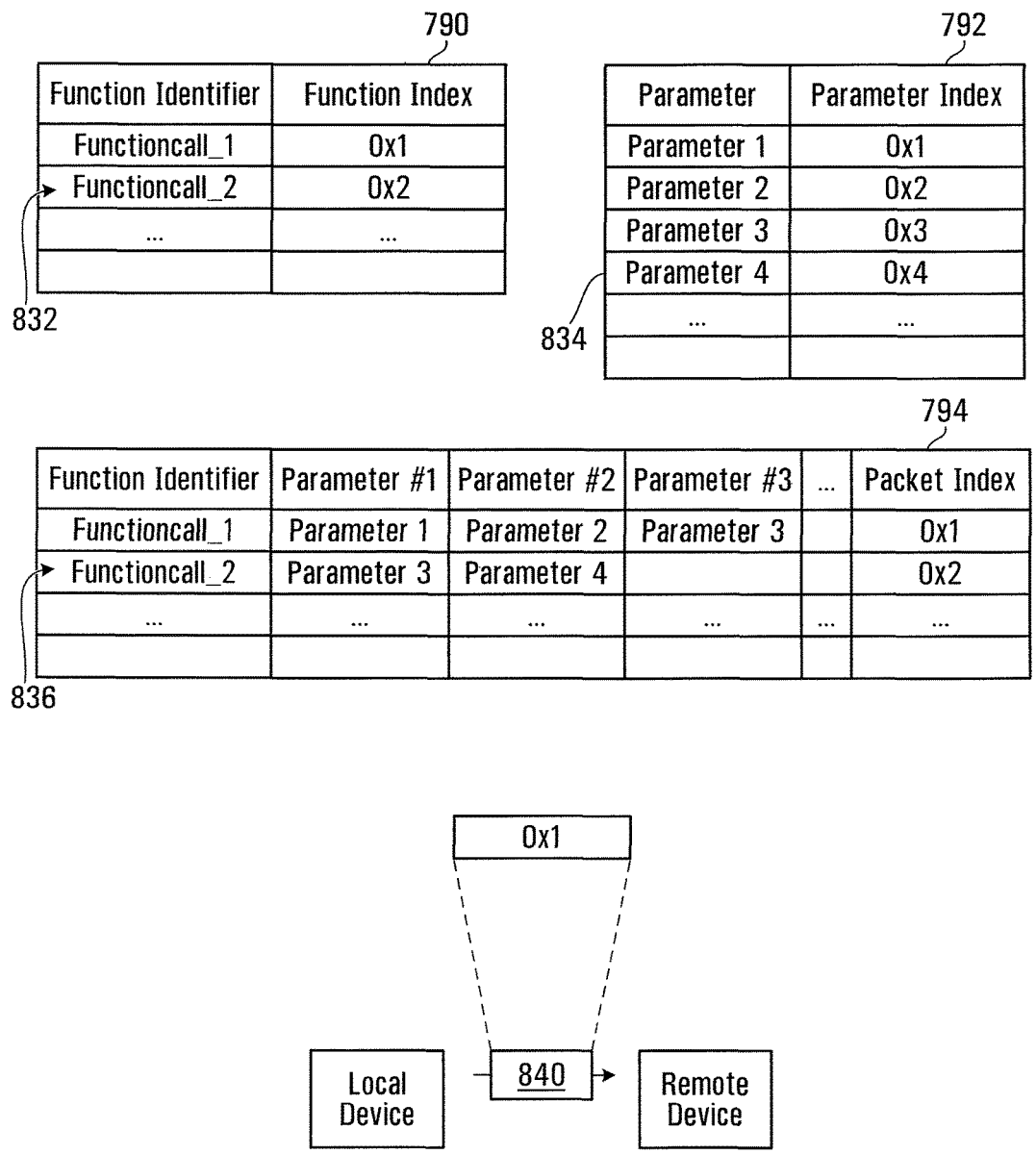
FIG. 8D conceptually illustrates the packet resulting from processing the third of three example instructions, in accordance with a non-limiting embodiment of the present invention.

Thus, the marshalling process proceeds to step S740, where packet index 0x1 is retrieved, resulting in the creation of a packet 840 (see FIG. 8D) that includes packet index 0x1. At step S750, packet 840 is released towards the remote device. A flag may be inserted into packet 840 in order to signal that what is being conveyed by packet 40 is a packet index rather than a function identifier, function index, parameter or parameter index.

It is noted that because packet 840 includes packet index 0x1 instead of function identifier Functioncall_1 or any of the parameters Param1, Param2, Param3—or even any of the parameter indexes 0x1, 0x2, 0x3—packet 840 is shorter in length than it would have been, had it included the aforementioned information. That is to say, packet 840 is condensed, which means that it takes less time to transmit and consumes less bandwidth through the network 450. Transmission efficiency thus increases as a result of the present marshalling process.

Further improvements in transmission efficiency can be provided in those cases where different functions call the same combination of parameters. Whereas in the above described marshalling process, some efficiency is gained by representing each parameter by its parameter index, there is still a need to transmit the parameter indexes in the correct order.

Accordingly, in a variant of the above described marshalling process, and with reference to FIG. 7C, a parameter combination index table 796 may be provided. The parameter combination index table 796 associates combinations of parameters to respective parameter combination indexes. That is to say, each entry in the parameter combination index table 796 associates an ordered set of parameters to a particular code (a "parameter combination index"). In one non-limiting embodiment, the parameter combination index table 796 may be implemented as a database that is maintained in the central RAM 203 or the central storage medium 204. In another non-limiting embodiment, the parameter combination index table 796 can be maintained on external storage, which is accessible to the central server 200 via a local storage area network (SAN), the network 450 or the network 400.

In order for the marshalling process to make use of the parameter combination index table 796, a modification is made to step S760. Specifically, step S760 would be modified so as to check the function index table 790 and the parameter combination index table 796. In this way, not only will it be determined that the function index table 790 includes a function index for the function identifier if it has already been called in the past, but also it will be determined that the parameter combination index table 790 includes a parameter combination index if the current combination of parameters has been called in the past, albeit using a different function. Accordingly, at step S765, the available function index and/or parameter combination index would be retrieved. Of course, if there is no entry in the parameter combination index table 796 for the current combination of parameters, then the parameter index table 792 can still be checked as previously described in order to see if any of the parameters has been part of a function call in the past.

In addition, step S775 would be modified so that if it is determined that there was no entry in the parameter combination index table 796 at step S760, a new entry for the current combination of parameters would be created in the parameter combination index table 796, and a parameter combination index would be assigned to this combination of parameters and stored in association therewith. Assignment of the parameter combination index to the current combination of parameters may proceed in accordance with a parameter combination index assignment algorithm that is known to both the local device and remote devices. If this is the case, then it is not necessary to inform the remote device of the parameter combination index assigned to the current combination of parameters, because the remote device can derive the parameter combination index by executing the same parameter combination index assignment algorithm in parallel. However, if the parameter combination index assignment algorithm is not known to the remote device, then it may be desirable to include, in the transmitted packet, the parameter combination index associated with the current combination of parameters.

In a further variant, the instruction issued by the game state management process and received by the local stub 620 may include a generic function identifier, while the specifics of the function can be partly embedded amongst the parameters. For example, consider the following sequence of instructions:

---
Functioncall(Function1, Param1, Param2, Param3);
Functioncall(Function2, Param4, Param5, Param6);
---

It will be seen that even though the function identifier is the same (i.e., Functioncall), the actual function being called is different and takes the form of a function argument. In such a case, the "combination of parameters" includes at least one parameter that specifies the nature of the function being called. Stated differently, in this variant, the function identifier is considered to be no different from any other parameter.

Figure 7D:
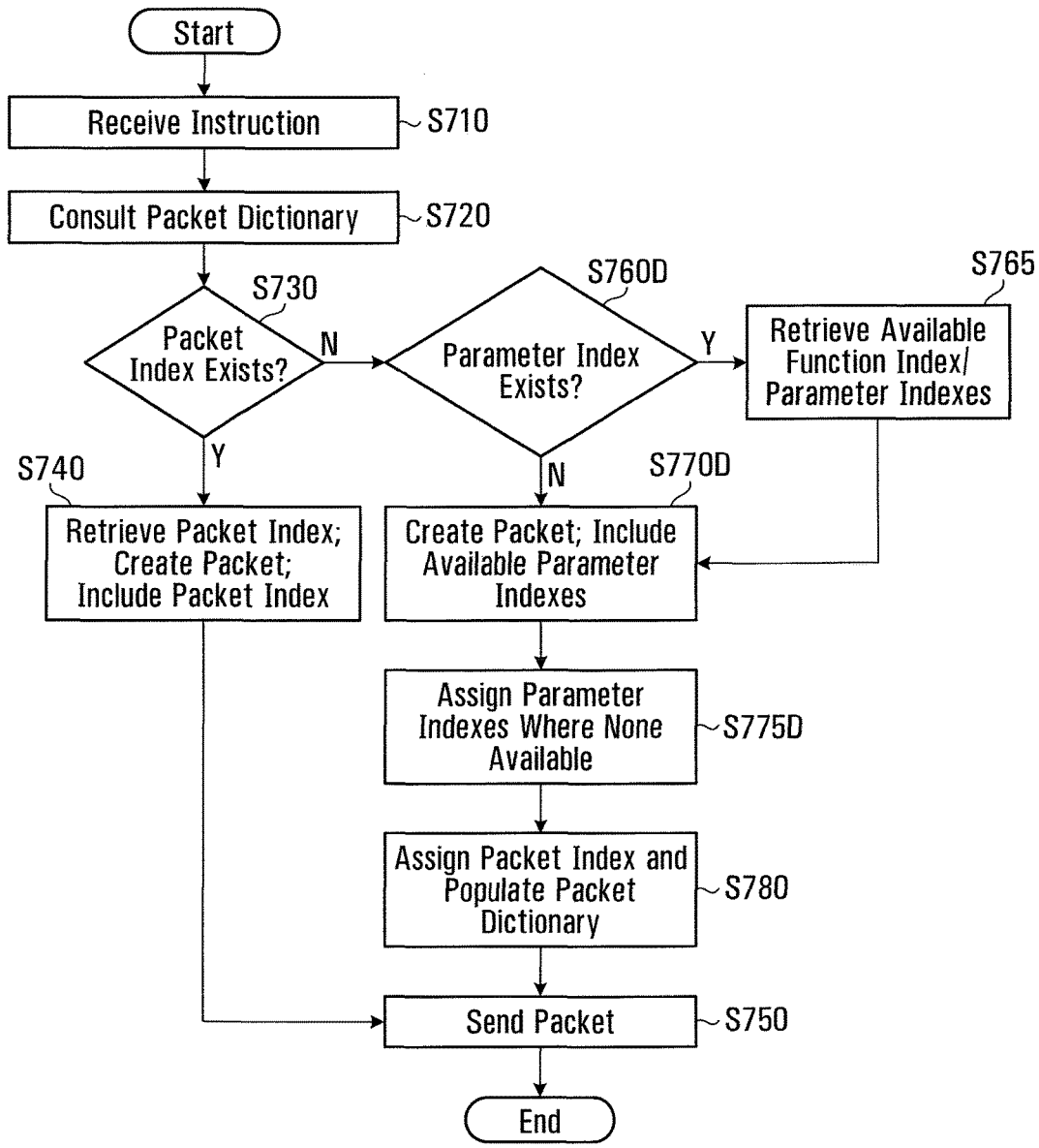
FIG. 7D is a variant of FIG. 7A in accordance with another non-limiting embodiment of the present invention.

In order to accommodate the above variant, the function index table 790 would effectively be subsumed into the parameter index table 792. Accordingly, the flowchart of FIG. 7A is reproduced in modified form in FIG. 7D, where a letter "D" next to a step number denotes a modified version of that step relative to FIG. 7A. Specifically, it is seen that step S760D includes consideration of the parameter index table 792 but does not include consideration of a "function index table". Also, reference to a "function index" has been omitted in steps S770D and S775D.

i. Unmarshalling

At the remote device, an unmarshalling process is executed on packets received over the network 450. The unmarshalling process can be carried out by the remote stub 650 in the rendering server 100, although it is to be understood that the unmarshalling process can be carried out by any entity that receives packets that have been marshaled as previously described with reference to FIG. 7A.

Figure 9A:
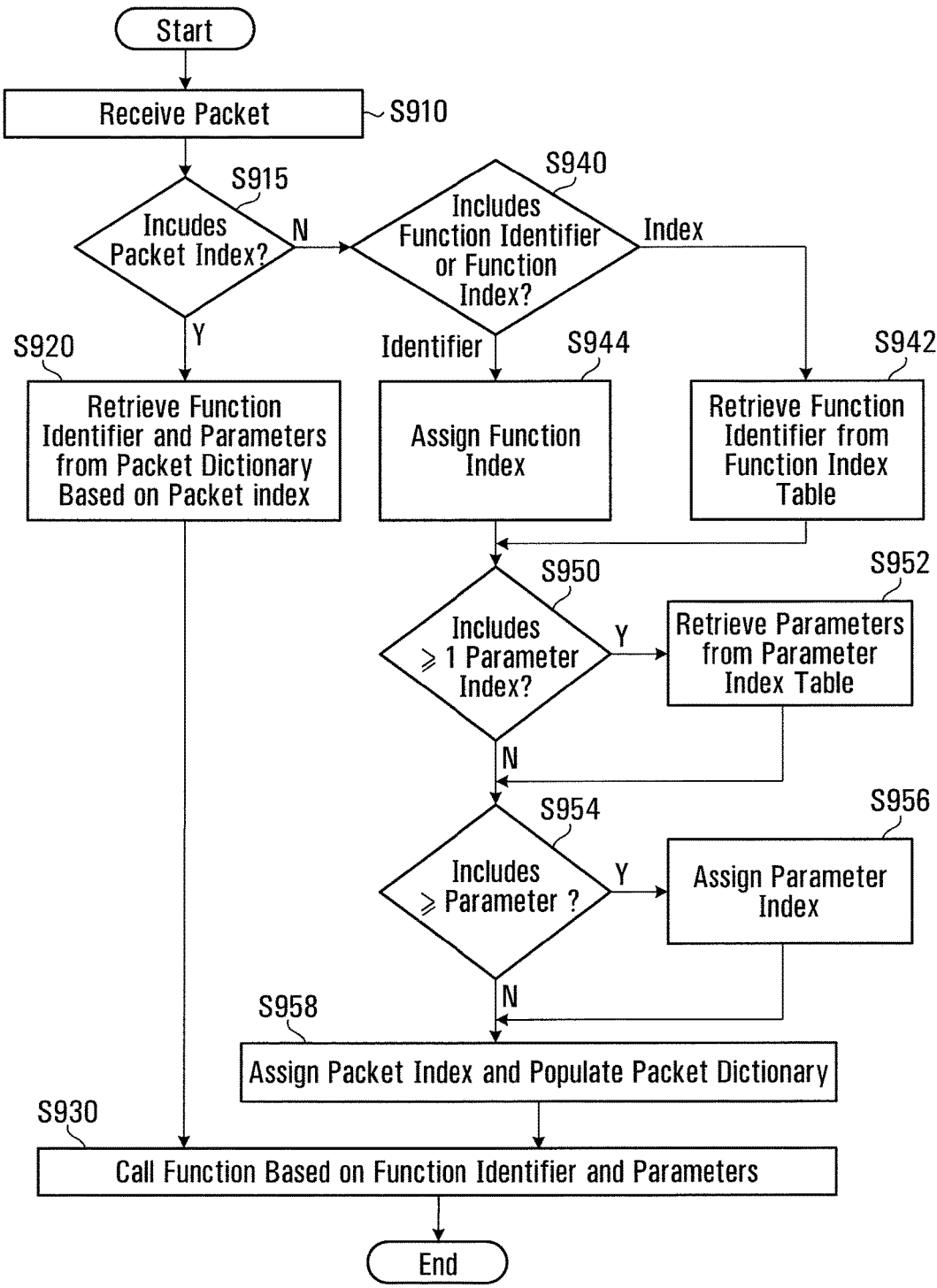
FIG. 9A is a flowchart representative of steps in an unmarshalling process, in accordance with a non-limiting embodiment of the present invention.
Figures 9B, 9C:
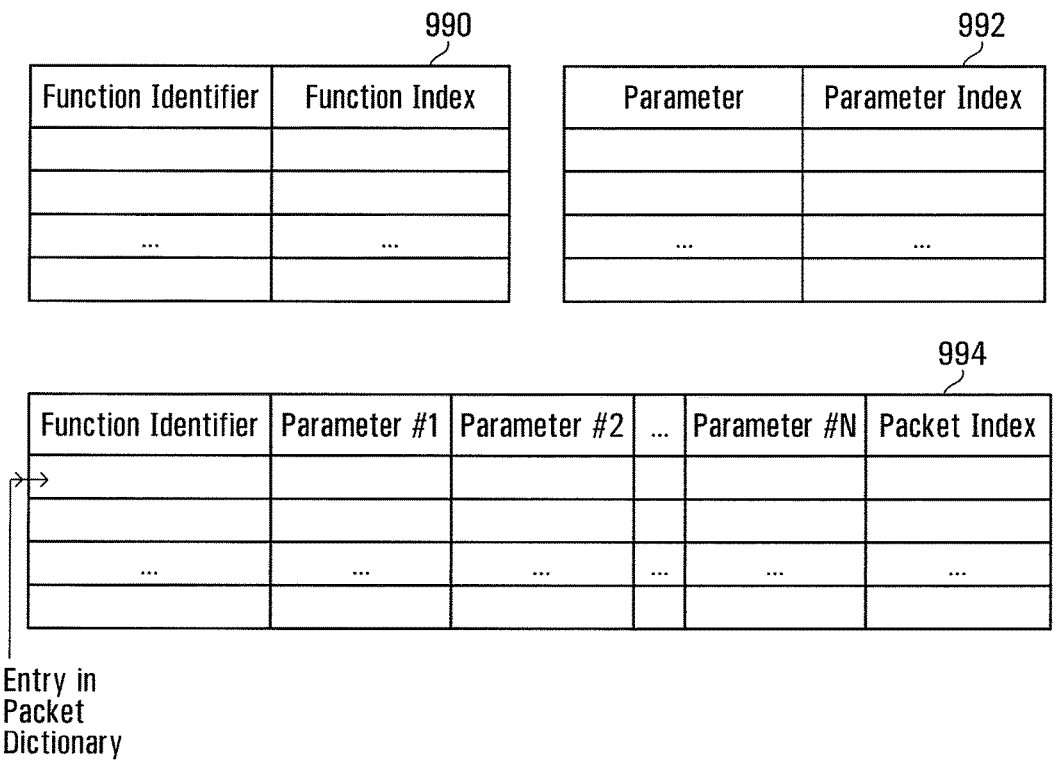
FIG. 9B shows various mappings used in the unmarshalling process, including a function index table, a parameter index table and a packet dictionary, in accordance with a non-limiting embodiment of the present invention.
FIG. 9C shows a parameter combination index table that may be used in some non-limiting embodiments of the present invention.

Referring now to FIG. 9B, it is assumed that the remote device (e.g., the rendering server 100) maintains a function index table 990, a parameter index table 992 and a packet dictionary 994. When properly constructed, these entities will be similar to the function index table 790, the parameter index table 792 and the packet dictionary 794 maintained by the local device (e.g., the central server 200). However, the entries in the function index table 990, the parameter index table 992 and the packet dictionary 994 are accessed differently. For example, the function index table 990, which associates function indexes with respective function identifiers, is accessed on the basis of a received function index; the parameter index table 992, which associates parameter indexes with respective parameters, is accessed on the basis of a received parameter index; and the packet dictionary 994, which associates each of a plurality of packet indexes to a specific function identifier and combination of parameters, is accessed on the basis of a received packet index.

In one non-limiting embodiment, the function index table 990, the parameter index table 992 and the packet dictionary 994 may be implemented as databases that are maintained in the RAM 103 or the storage medium 104 of the rendering server 100. In another non-limiting embodiment, the function index table 990, the parameter index table 992 and the packet dictionary 994 can be maintained on external storage, which is accessible to the rendering server 100 via a local storage area network (SAN), the network 450 or the network 400.

Reference is now made to FIG. 9A, which shows a flowchart representing the unmarshalling process, in accordance with a non-limiting embodiment of the present invention.

At step S910, a packet is received. The packet can be received over the network 450 from the local device (e.g., the central server 200), which instantiates the local stub 620 responsible for creating the packet. At step S915, it is determined whether the received packet includes a packet index. In the present embodiment, it is assumed that when the received packet includes a packet index, it does not include a corresponding function identifier or combination of parameters, and when the received packet includes the corresponding function identifier or combination of parameters, it does not include a packet index. In such an embodiment, the presence of a packet index in a received packet signals that an identical packet (i.e., representing the same function and parameters) has previously been created by the local device and transmitted to the remote device.

Thus, if step S910 reveals that the received packet includes a packet index, the unmarshalling process proceeds to step S920, where the packet dictionary 994 is consulted on the basis of the packet index. In this manner, a corresponding function identifier and combination of parameters are obtained from the packet dictionary 994, and the unmarshalling process proceeds to step S930. At step S930, the function identified by the function identifier is called locally on the remote device, using the retrieved parameters (in the appropriate combination) as arguments. For example, a game screen can be rendered by the rendering server 100. The rendered game screen can be distributed to the central server 200 (via a remote procedure call in the opposite direction) or directly to the participant for which the rendering instruction was carried out.

However, if the received packet does not include a packet index, then this signals that the received packet was not previously received, and the unmarshalling process proceeds to step S940. At this stage, a series of tests can be conducted, in no particular required order. These tests may also be conducted in parallel. Firstly, it can be verified whether the received packet includes either a function index or a function identifier. In the case where the received packet includes a function index, the unmarshalling process proceeds to step S942, where the function index table 990 is consulted on the basis of the function index.

In this manner, a corresponding function identifier is obtained from the function index table 990. In the case where the received packet includes a function identifier, the unmarshalling process proceeds to step S944, where a function index is assigned to the function identifier, and an entry is created in the function index table 990, which associates the function index and the function identifier. Assignment of the function index to the function identifier may proceed in accordance with a function index assignment algorithm that is assumed to have been used by the local device during execution of the marshalling process.

At step S950, it can be verified whether the received packet includes one or more parameter indexes. In the affirmative, the unmarshalling process proceeds to step S952, where the parameter index table 992 is consulted on the basis of the parameter index or indexes. As a result, corresponding parameters (or possibly a single corresponding parameter) are retrieved from the parameter index table 992. At step 954, it can be verified whether the received packet includes one or more parameters, rather than parameter indexes. In the affirmative, the unmarshalling process proceeds to step S956, where a parameter index is assigned to each such parameter, and an entry is created in the parameter index table 992 for each such parameter, thereby associating each such parameter with its newly assigned parameter index. Assignment of parameter indexes to parameters may proceed in accordance with a parameter index assignment algorithm that is assumed to have been used by the local device during execution of the marshalling process.

At step S958, a packet index is assigned to the function identifier and combination of parameters that were either included in the received packet or were retrieved from the function index table 992 and/or the parameter index table 994. Assignment of the packet index to the function identifier and combination of parameters may proceed in accordance with a packet index assignment algorithm that is assumed to have been used by the local device during execution of the marshalling process.

In the above embodiment, it was assumed that when the received packet (see step S910) includes a packet index, it does not include the corresponding function identifier or combination of parameters, and vice versa. In such an embodiment, the presence of a packet index in a received packet signals that the very same packet has previously been received. Thus, the packet dictionary 994 has already been populated with that very same packet index. On the other hand, when a previously unrecognized set of function identifier and combination of parameters is received, then the packet dictionary 994 will be populated with a new packet index, which is assigned in accordance with a packet index assignment algorithm (see step S956). However, this need not be the case in every embodiment. Indeed, in some embodiments, the first time that a previously unrecognized set of function identifier and combination of parameters is received, it may be accompanied by its own pre-assigned packet index (e.g., one that was assigned by the local device during execution of the marshalling process and transmitted to the remote device). In such a case, the packet dictionary 994 will associate the received packet index with the received set of function identifier and combination of parameters.

It should also be appreciated that when the function index table 990, the parameter index table 992 and the packet dictionary 994 maintained by the remote device are identical to the function index table 790, the parameter index table 792 and the packet dictionary 794 maintained by the local device, it may be possible for the local device to share these objects with the remote device and keep them synchronized. Such an approach may simplify the unmarshalling process, as it would not require the same object on the local device and the remote device to be twice populated. Sharing between the local device and the remote device can be achieved by making the function index table 990, the parameter index table 992 and the packet dictionary 994 accessible to both the remote device and the local device, e.g., via the network 450.

j. Unmarshalling (Example)

An example description will now be provided in order to illustrate operation of the unmarshalling process for handling three received packets 810, 830 and 840 created using the previously described marshalling process. From FIGS. 8B-8D, it can be recalled that packets 810, 830 and 840, which were sent from the local device to the remote device, include the following information:

Contents of Packet 810:

function identifier: (Functioncall_1);
parameters: (Param1, Param2, Param3);

Contents of Packet 830:

function identifier: (Functioncall_2);
parameter index: 0x3;
parameter: Param4;

Contents of Packet 840:
packet index: 0x1

Figure 10A:
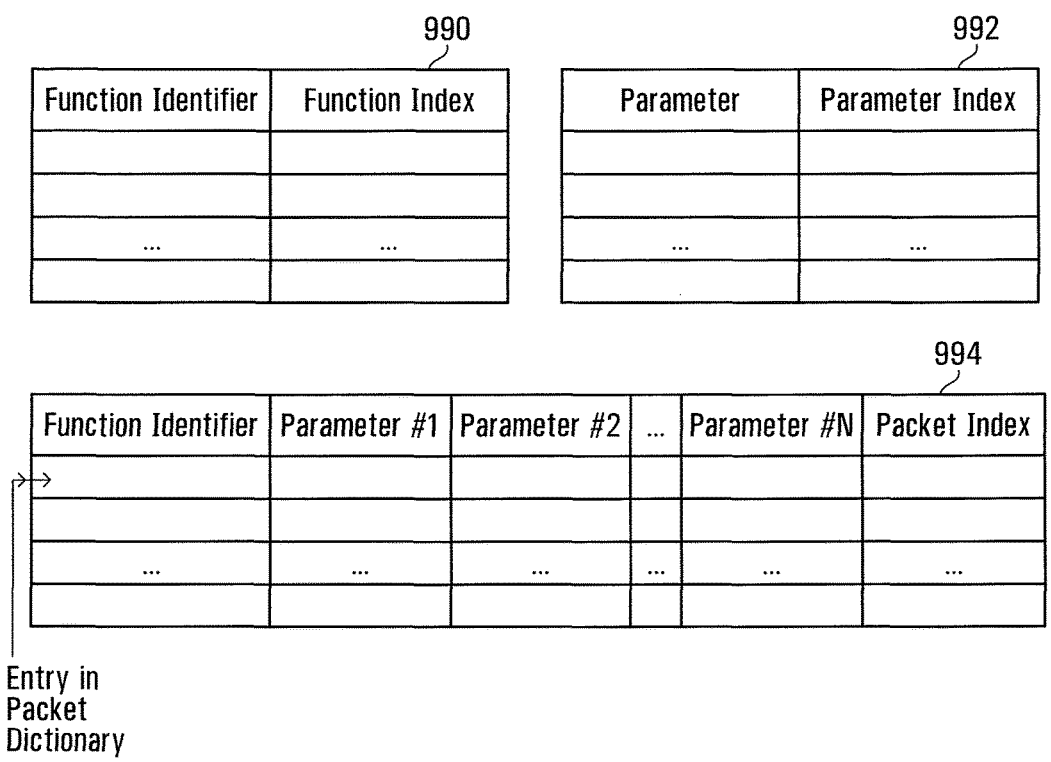
FIG. 10A conceptually illustrates the state of the function index table, the parameter index table and the packet dictionary, prior to processing a first received packet, in accordance with a non-limiting embodiment of the present invention.

FIG. 10A shows the status of the packet dictionary 994, the function index table 990 and the parameter index table 992 prior to receipt or processing of packet 810. Quite simply, the packet dictionary 994, the function index table 990 and the parameter index table 992 are all empty.

Consider now three iterations of the unmarshalling process, as executed on packets 810, 830 and 840, respectively. The first iteration of the unmarshalling process begins at step S910, whereby packet 810 is received. The function identifier is Functioncall_1 and the combination (ordered set) of parameters is Param1, Param2, Param3. Step S920 reveals that there is no packet index included with packet 810 and therefore the unmarshalling process proceeds to step S940.

Figure 10B:
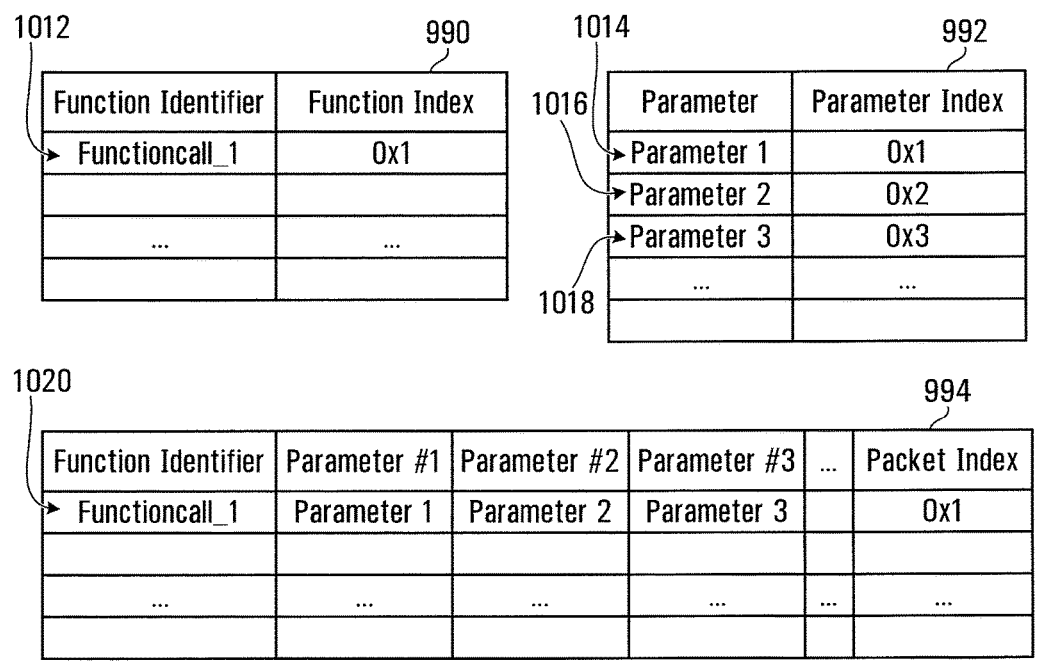
FIG. 10B conceptually illustrates the state of the function index table, the parameter index table and the packet dictionary, after processing the first received packet, in accordance with a non-limiting embodiment of the present invention.

At step S940, it is checked whether packet 810 specifies a function identifier or a function index. Since packet 810 specifies function identifier Functioncall_1, and thus, with additional reference to FIG. 10B, the unmarshalling process proceeds to step S944, whereby an entry 1012 is created in the function index table 990 for function identifier Functioncall_1, and a function index 0x1 is assigned to function identifier Functioncall_1 (using the same algorithm as in the marshalling process) and stored in the newly created entry 1012.

At step S950, it is checked whether packet 810 includes at least one parameter index. Since packet 810 only includes parameters and no parameter indexes, the unmarshalling process proceeds to step S954. At step S954, it is checked whether packet 810 includes at least one parameter. Since this is indeed the case, the unmarshalling process proceeds to step S956, whereby three new entries 1014, 1016, 1018 are created in the parameter index table 992, one each for Param1, Param2 and Param3, and parameter indexes 0x1, 0x2 and 0x3 are assigned to parameters Param1, Param2 and Param3 (using the same algorithm as in the marshalling process) and stored in the respective newly created entries 1014, 1016, 1018.

At step S958, a new entry 1020 is created in the packet dictionary 994 for the function identifier Functioncall_1 together with the combination of parameters Param1, Param2, Param3, to which a packet index 0x1 is assigned (using the same algorithm as in the marshalling process).

At step S930, the function identified by the function identifier Functioncall_1 is called, using the parameters Param1, Param2, Param3 as arguments. For example, a game screen can be rendered by the rendering server 100. The rendered game screen can be distributed to the central server 200 (via a remote procedure call in the opposite direction) or directly to the participant for which the rendering instruction was carried out. Of course, it is to be understood that the present invention is not limited to rendering instructions or a gaming environment.

The second iteration of the unmarshalling process begins at step S910, whereby packet 830 is received. The function identifier is Functioncall_2, which is received together with parameter index 0x3 and parameter Param4. Step S920 reveals that there is no packet index included with packet 830 and therefore the unmarshalling process proceeds to step S940.

Figure 10C:
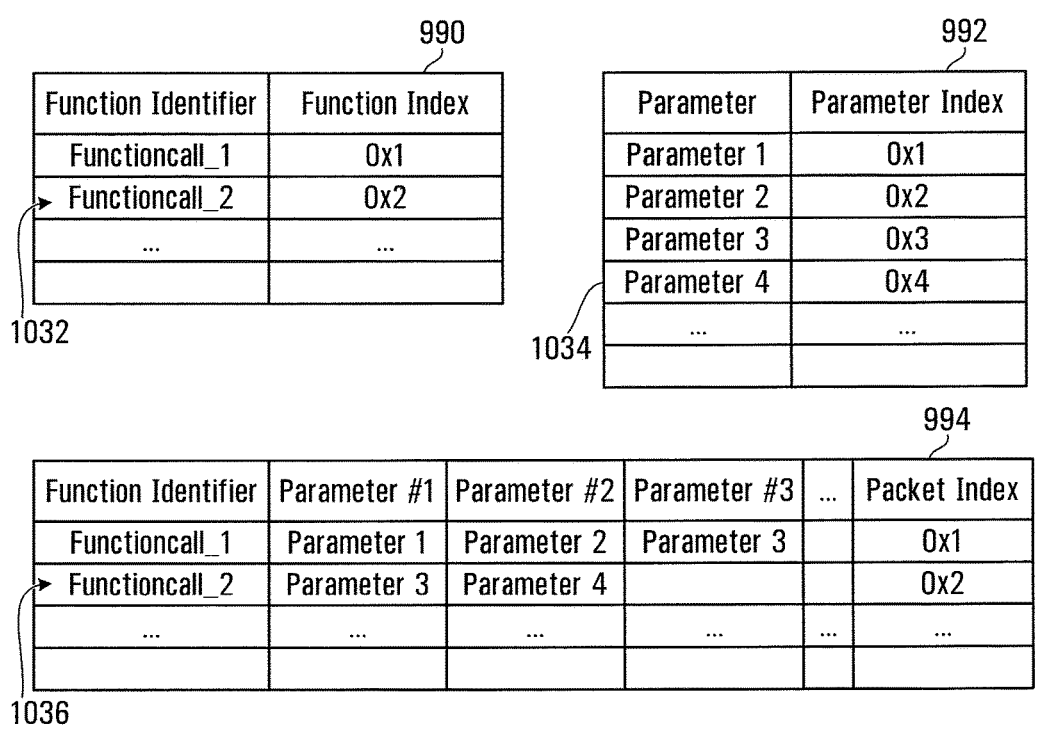
FIG. 10C conceptually illustrates the state of the function index table, the parameter index table and the packet dictionary, after processing the second received packet, in accordance with a non-limiting embodiment of the present invention.

At step S940, it is checked whether packet 830 specifies a function identifier or a function index. Since packet 830 specifies function identifier Functioncall_2, and with additional reference to FIG. 10C, the unmarshalling process proceeds to step S944, whereby an entry 1032 is created in the function index table 990 for function identifier Functioncall_2, and a function index 0x2 is assigned to function identifier Functioncall_1 (using the same algorithm as in the marshalling process) and stored in the newly created entry 1032.

At step S950, it is checked whether packet 830 includes at least one parameter index. Since packet 830 includes only parameter index 0x3, the unmarshalling process proceeds to step S952, where the parameters associated with parameter index 0x3 are retrieved from the parameter index table 992. In particular, it will be recalled that execution of step S956 in connection with unmarshalling of packet 810 resulted parameter index 0x3 having been assigned to Param3. Therefore, during current execution of step S952, the parameter Param3 is retrieved.

Next, at step S954, it is checked whether packet 830 at least one parameter. Since this is indeed the case (namely, packet 830 includes parameter Param4), the unmarshalling process proceeds to step S956, whereby a new entry 1034 is created in the parameter index table 992 for Param4. In this case, parameter index 0x4 is assigned to parameter Param4 using the same algorithm as in the marshalling process, and parameter index 0x4 is stored in the newly created entry 1034.

At step S958, a new entry 1036 is created in the packet dictionary 994 for the function identifier Functioncall_2 together with the combination of parameters Param3, Param4, to which a packet index 0x2 is assigned (using the same algorithm as in the marshalling process).

At step S930, the function identified by the function identifier Functioncall_2 is called, using the parameters Param3, Param4 as arguments. For example, a game screen can be rendered by the rendering server 100. The rendered game screen can be distributed to the central server 200 (via a remote procedure call in the opposite direction) or directly to the participant for which the rendering instruction was carried out. Of course, it is to be understood that the present invention is not limited to rendering instructions or a gaming environment.

The third iteration of the unmarshalling process begins at step S910, whereby packet 840 is received. Packet 840 includes packet index 0x1. Since step S920 will reveal that there is a packet index included with packet 840, the unmarshalling process proceeds to step S920.

At step S920, the function identifier and the parameters associated with packet index 0x1 are retrieved from the packet dictionary 994. In this case, the retrieved function identifier will be Functioncall_1 and the retrieved combination of parameters will be Param1, Param2, Param3.

The unmarshalling process then proceeds to step S930, where the function identified by the function identifier Functioncall_1 is called, using the parameters Param1, Param2, Param3 as arguments. For example, a game screen can be rendered by the rendering server 100. The rendered game screen can be distributed to the central server 200 (via a remote procedure call in the opposite direction) or directly to the participant for which the rendering instruction was carried out. Of course, it is to be understood that the present invention is not limited to rendering instructions or a gaming environment.

Clearly, although packets 810 and 840 result in execution of the same function with the same parameters, the amount of network resources (bandwidth) required to transmit packet 840 is less than the amount of network resources required to transmit packet 810.

As has already been mentioned in connection with the marshalling process, further improvements in transmission efficiency may be achievable in those cases where the same combination of parameters is called, although possibly by different functions. To support the modified marshalling process described with reference to FIG. 7C, the unmarshalling process may be modified accordingly. In particular, with reference to FIG. 9C, a parameter combination index table 996 may be provided. The parameter combination index table 996 associates parameter combination indexes with respective combinations of parameters. That is to say, each entry in the parameter combination index table 996 associates an ordered set of parameters to a particular code (referred to as a parameter combination index). In one non-limiting embodiment, the parameter combination index table 996 may be implemented as a database that is maintained in the RAM 103 or the storage medium 104 of the rendering server 100. In another non-limiting embodiment, the parameter combination index table 996 can be maintained on external storage, which is accessible to the rendering 100 via a local storage area network (SAN), the network 450 or the network 400.

Figure 9D:
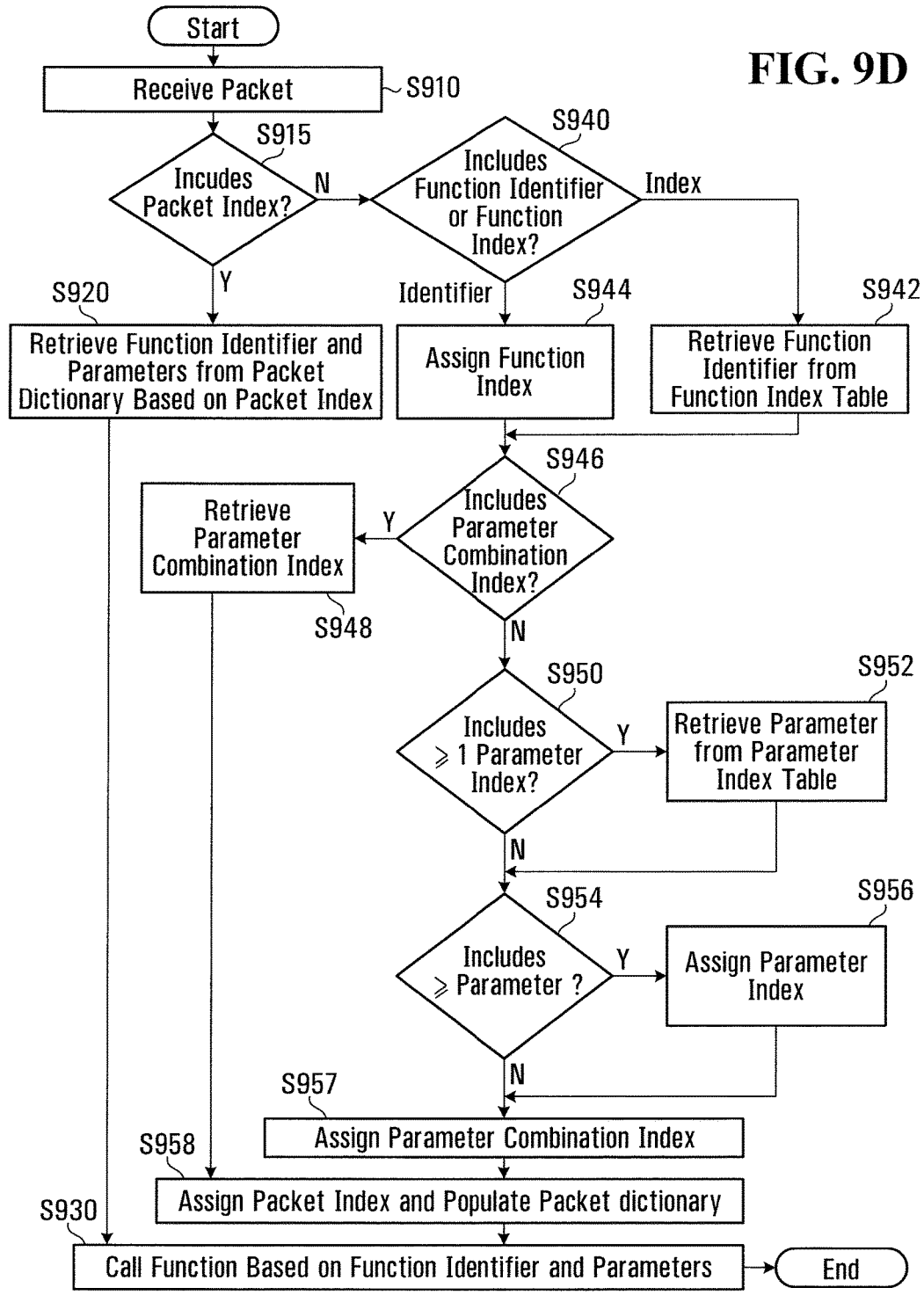
FIG. 9D is a variant of FIG. 9A in accordance with another non-limiting embodiment of the present invention.

To make use of the parameter combination index table 996, a modification is made to the unmarshalling process. Specifically, with reference to FIG. 9D, a new step S946 is introduced, where it would be checked whether the received packet includes a parameter combination index. In the affirmative, the corresponding combination of parameters would be retrieved from the parameter combination index table 996 at step S948, and the unmarshalling process would then rejoin the unmarshalling process of FIG. 9A at step S958. However, if the received packet was found not to include a parameter combination index, the unmarshalling process proceeds to execute steps S950 through S956 as previously described. In addition, a new step S957 would be provided, whereby a new entry would be created in the parameter combination index table 996, and a parameter combination index would be assigned to the current combination of parameters and stored in association therewith. Assignment of the parameter combination index to the current combination of parameters may proceed in accordance with the same parameter combination index assignment algorithm that was used by the local device.

It will be recalled that in a further variant, the function identifier may in fact be one of the parameters. In such a case, the "combination of parameters" includes at least one parameter that specifies the nature of the function being called. In order to accommodate the above variant, the function index table 990 is effectively subsumed into the parameter index table 992. In such an embodiment, steps S940, S942 and S944 from the flowchart in FIG. 9A can effectively be omitted.

k. Sequence Indexing

Figure 11A:
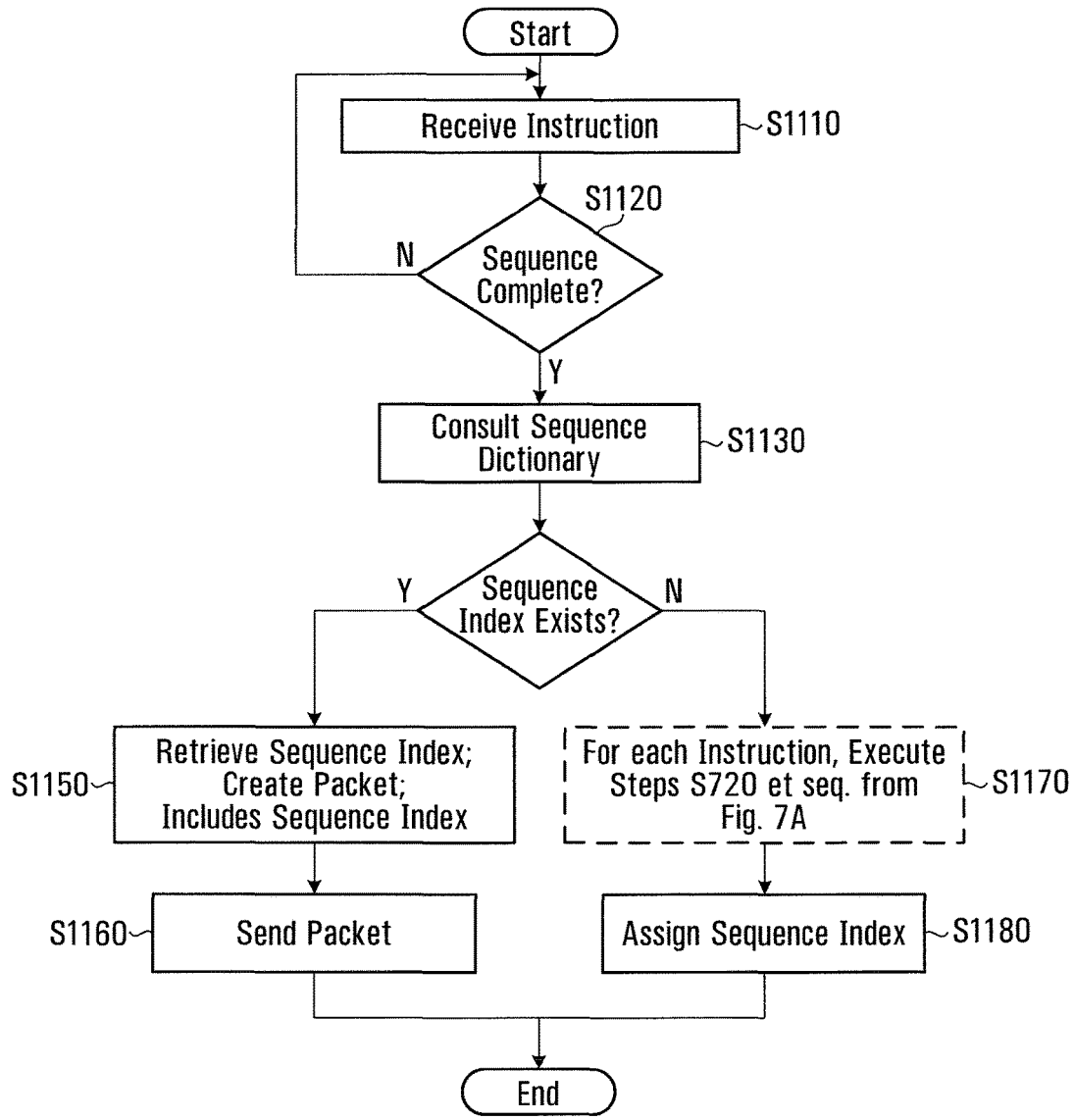
FIG. 11A is a flowchart representative of steps in a marshalling process for handling sequences of instructions, in accordance with a non-limiting embodiment of the present invention.

It should be appreciated that still further efficiencies may be gained by making the observation that sequences of instructions may repeat, and by applying the above described principles to this observation. Specifically, at the local device, the marshalling process for condensing sequences of received instructions may be represented by a flowchart illustrated in FIG. 11A. The marshalling process may be executed by the local stub 620 in the central server 200, although the presently described process can be applied wherever remote procedure calls are used.

At step S1110, an instruction is received. In a non-limiting example, the instruction may be a rendering instruction issued by a game state management process at the application layer. At step S1120, it is verified whether the received instruction completes a sequence of instructions, so as to proceed with consulting a sequence dictionary at step S1130. This can be determined in a number of ways. For example, the marshalling process may consider that a fixed number of received instructions form a sequence. In another embodiment, the marshalling process may wait until several instructions are received and may process them to detect patterns therein and then begin processing the instructions in the oldest (least recent) sequence in accordance with the knowledge that there will be some repetition and therefore efficiency gain. Other methodologies for determining whether a sequence has been completed will be understood as being within the scope of the present invention.

Figure 11B:
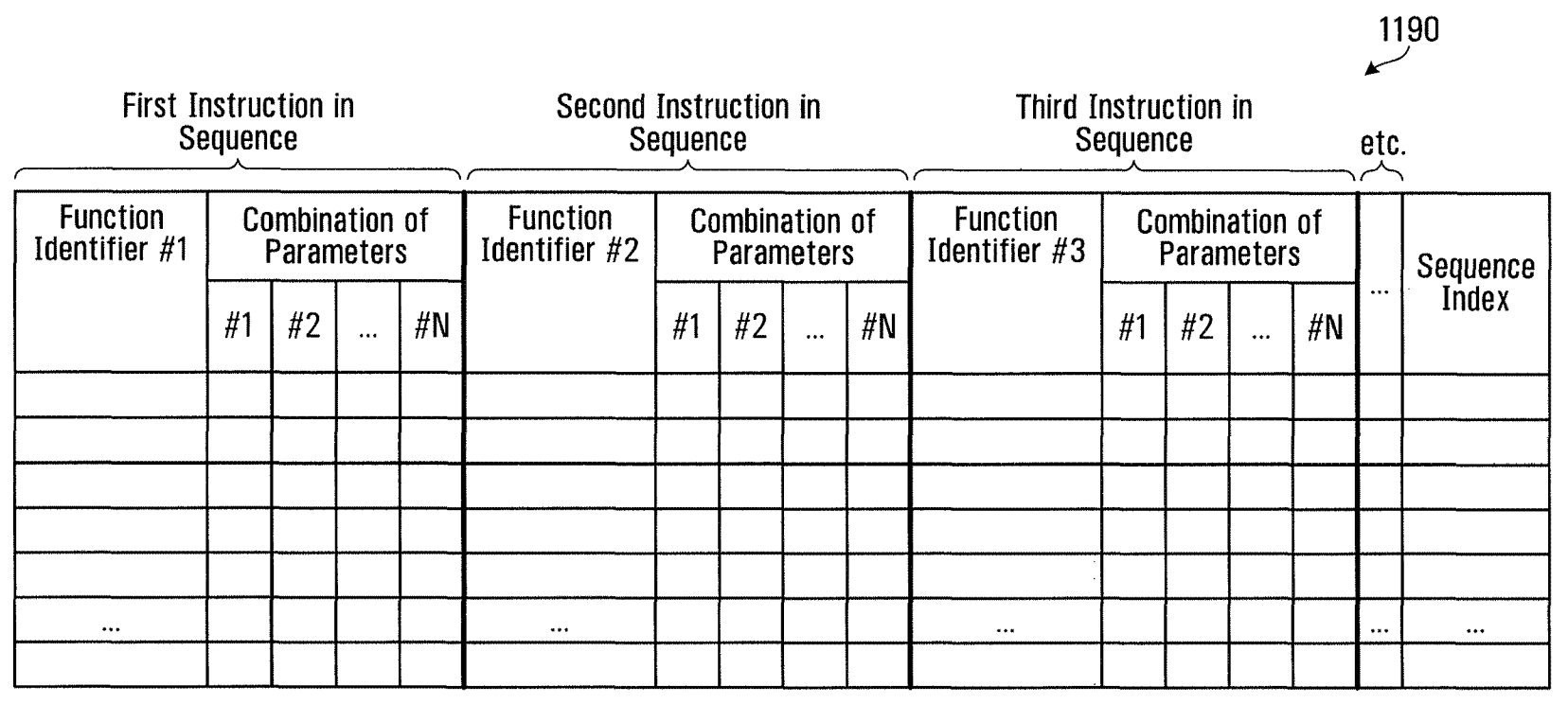

Assuming that a complete sequence of instructions has been detected (which will include, say, instructions 1 through N), the marshalling process proceeds to step S1130, where a sequence dictionary is consulted. At this point, reference is made to FIG. 11B, which shows a sequence dictionary 1190. The sequence dictionary 1190 comprises entries that associate sequence indexes with respective sequences of instructions. Each instruction represented in a given sequence of instructions may be associated with a respective function identifier and a respective combination of parameters. As such, each entry in the sequence dictionary 1190 associates a sequence index with a sequence of function identifiers and respective combinations of parameters.

In one non-limiting embodiment, the sequence dictionary 1190 may be implemented as a database that is maintained in the central RAM 203 or the central storage medium 204. In another non-limiting embodiment, the sequence dictionary 1190 can be maintained on external storage, which is accessible to the central server 200 via a local storage area network (SAN), the network 450 or the network 400.

At step S1130, the sequence dictionary 1190 is checked. In particular, the current sequence of function identifiers and respective combinations of parameters (in instructions 1 through N) is compared against sequences of function identifiers and respective combinations of parameters maintained in the entries of the sequence dictionary 1190 with the aim of determining whether the sequence dictionary 1190 includes a sequence index corresponding to the current sequence of function identifiers and respective combinations of parameters. If the answer is affirmative, this will indicate that a packet representing this same sequence of instructions has already been created in the past, and that a sequence index has already been assigned to this particular sequence of instructions. In that case, the marshalling process proceeds to step S1150, wherein the sequence index is retrieved from the sequence dictionary, and a packet is created such that it includes the sequence index. In addition, where one or more instructions refers to function arguments that are not considered to be condensable, these may be appended to the packet, such as in a pre-determined location that will allow the recipient to determine which instruction the function arguments are associated with.

The marshalling process then proceeds to step S1160, wherein the packet is transmitted to the remote device (e.g., the rendering server 100) over the network 450. The packet also includes any necessary header or other information that would make it suitable for transmission over the network 450. For example, the packet may be formatted in such a way as to alert the receiving entity that it carries a sequence index as opposed to a packet index, a function identifier or parameters.

However, if at step S1130 it was determined that the sequence dictionary 1190 did not include a sequence index for the current sequence of instructions, the marshalling process proceeds to step S1170. This includes execution of steps 720 from the flowchart of FIG. 7A and all steps subsequent thereto, for each instruction in the sequence of instructions. In addition, the marshalling process executes step S1180, wherein an entry is created in the sequence dictionary 1190 for the current sequence of function identifiers and respective combinations of parameters (in instructions 1 through N), and a sequence index is assigned thereto and stored in the sequence dictionary 1190.

It will be appreciated that in an actual implementation, it is not necessary for the marshalling process to wait at step 1120. Instead, it is envisaged that the marshalling process may effect pre-processing on the instructions that have been received thus far, which can include any of the steps in FIG. 7A with the exception of step S750. If it turns out that a sequence index will be found for the sequence currently being compiled, then this pre-processing will turn out to have been wasteful, but in the event that a sequence index is not found, such pre-processing will minimize the latency required to create the packet.

An example description will now be provided in order to illustrate operation of the marshalling process in the creation of three packets from three sequences of three instructions per sequence. That is to say, consider the following nine instructions:

Functioncall_1(Param1, Param2, Param3);
Functioncall_2(Param3, Param4);
Functioncall_1(Param1, Param 2, Param3);

-continued

```
Functioncall_1(Param1, Param2, Param3);
Functioncall_2(Param3, Param4);
Functioncall_3(Param4, Param5, Param6);
Functioncall_1(Param1, Param2, Param3);
Functioncall_2(Param3, Param4);
Functioncall_1(Param1, Param2, Param3).
```

It will be noted that the first, third, fourth, seventh and ninth instructions are identical and refer to the same function identifier Functioncall_1 and the same function arguments Param1, Param2 and Param3. It will also be noted that the second, fifth and eighth instructions are identical and refer to the same function identifier Functioncall_2 and the same function arguments Param3, Param4. It is assumed that all function arguments are condensable, and therefore qualify as "parameters" as used herein. However, this assumption is made merely for the sake of simplicity and it need not be the case in every embodiment.

Figure 12A:
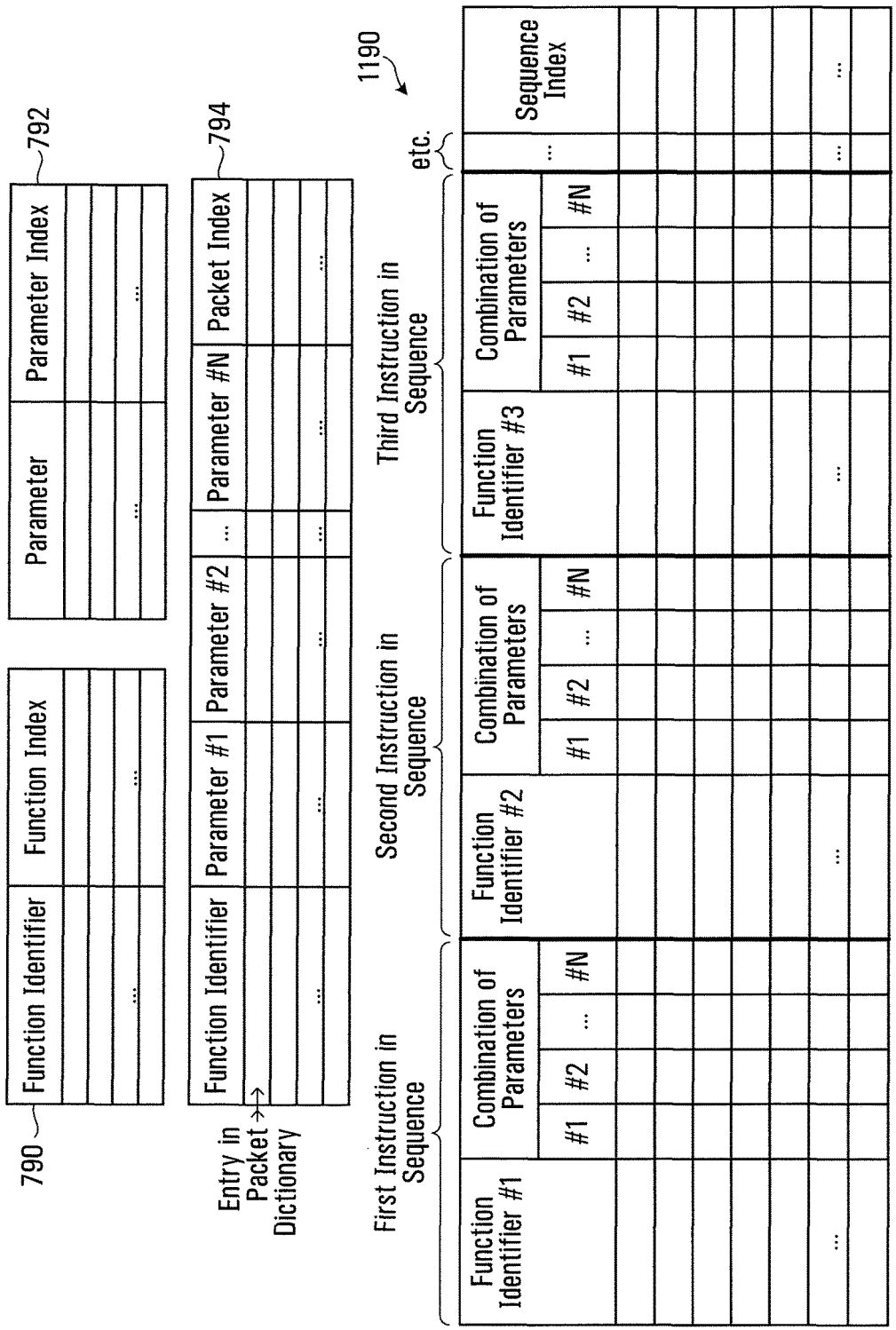
FIG. 12A conceptually illustrates the state of the function index table, the parameter index table, the packet dictionary and the sequence dictionary, prior to processing a first of three example sequences of three instructions per sequence, in accordance with a non-limiting embodiment of the present invention.

FIG. 12A shows the status of the packet dictionary 794, the function index table 790, the parameter index table 792 and the sequence dictionary 1190 prior to receipt or processing of the first instruction. Quite simply, the packet dictionary 794, the function index table 790, the parameter index table 792 and the sequence dictionary 1190 are all empty. This scenario remains substantially the same until the third instruction (i.e., the last instruction in a sequence of 3 instructions) is received. That is to say, whereas in accordance with the marshalling process of FIG. 7A, packets would be generated one at a time, this is not the case in the marshalling process of FIG. 11, because packets are not released until a complete sequence of instructions has been received. In this non-limiting case, used only for purposes of example, a complete sequence is considered to include three instructions.

Figure 12B:
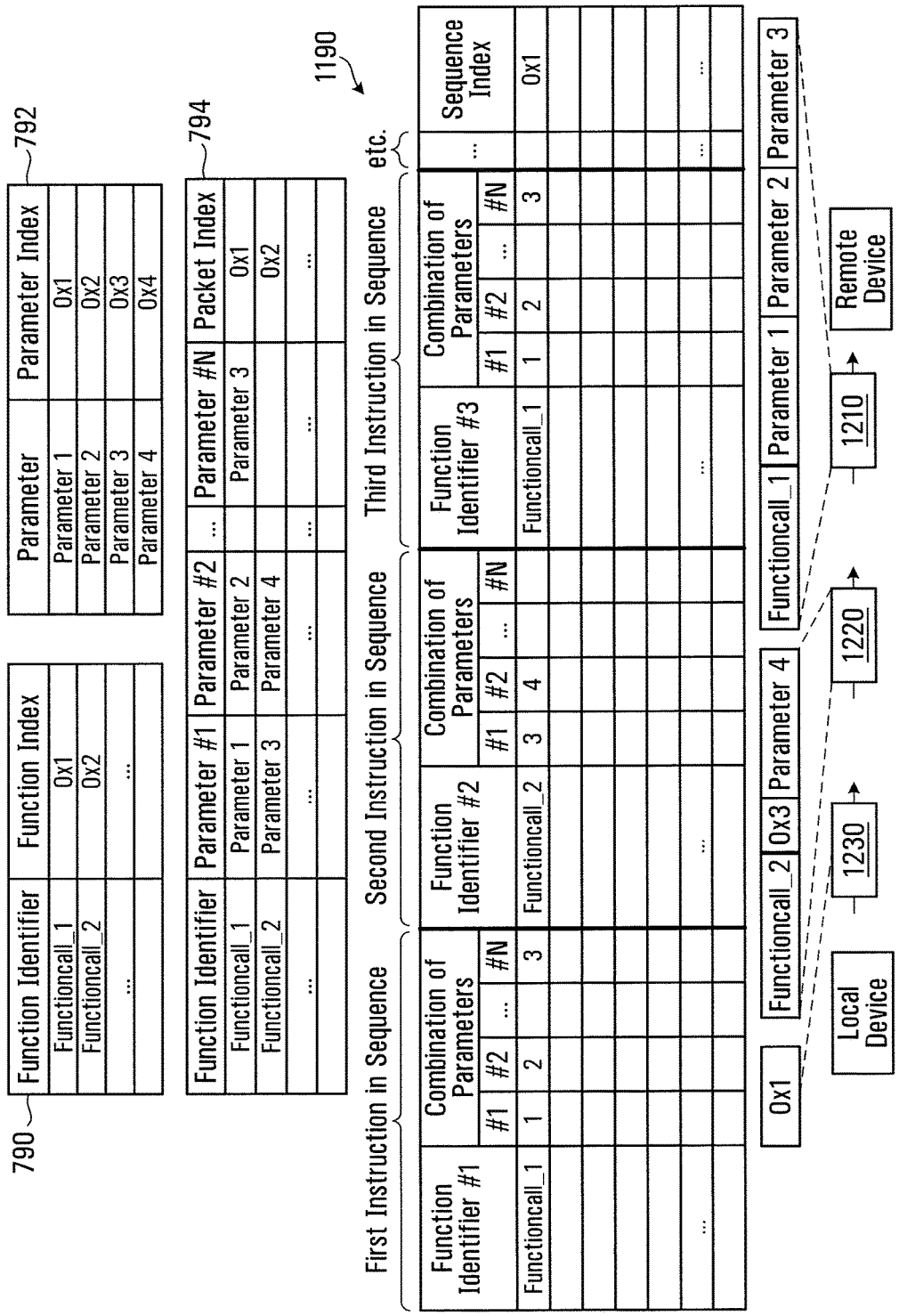
FIG. 12B conceptually illustrates the state of the function index table, the parameter index table, the packet dictionary and the sequence dictionary, after processing the first example sequence of three instructions, as well as the resulting packet, in accordance with a non-limiting embodiment of the present invention.

FIG. 12B shows the status of the packet dictionary 794, the function index table 790, the parameter index table 792 and the sequence dictionary 1190 after having received and processed the third instruction. Here it is seen that the parameter index table 792 includes four entries, one for each of Param1, Param2, Param3 and Param4, which are associated with parameter indexes 0x1, 0x2, 0x3 and 0x4, respectively. The function index table 790 includes two entries, one for each of Functioncall_1 and Functioncall_2, which are associated with function indexes 0x1 and 0x2, respectively. The packet dictionary 794 includes two entries, one for Functioncall_1 together with the combination of Param1, Param2, Param3 (associated with packet index 0x1) and one for Functioncall_2 together with the combination of Param3, Param4 (associated with packet index 0x2). Finally, the sequence dictionary 1190 includes one entry for the first sequence of three instructions, and which is associated with sequence index 0x1.

FIG. 12B also shows that three packets 1210, 1220, 1230 have been issued, corresponding to the three instructions in the first sequence:
Contents of Packet 1210:

```
function identifier: (Functioncall_1);
parameters: (Param1, Param2, Param3);
```

Contents of Packet 1220:

```
function identifier: (Functioncall_2);
parameter index: 0x3;
parameter: Param4;
```

Contents of Packet 1230:
packet index: 0x1

It should be appreciated that n some embodiments, packets 1210, 1220, 1230 may include, where appropriate, a flag to allow the recipient to distinguish between a packet index, a function identifier, a function index, a parameter and a parameter index.

Figure 12C:
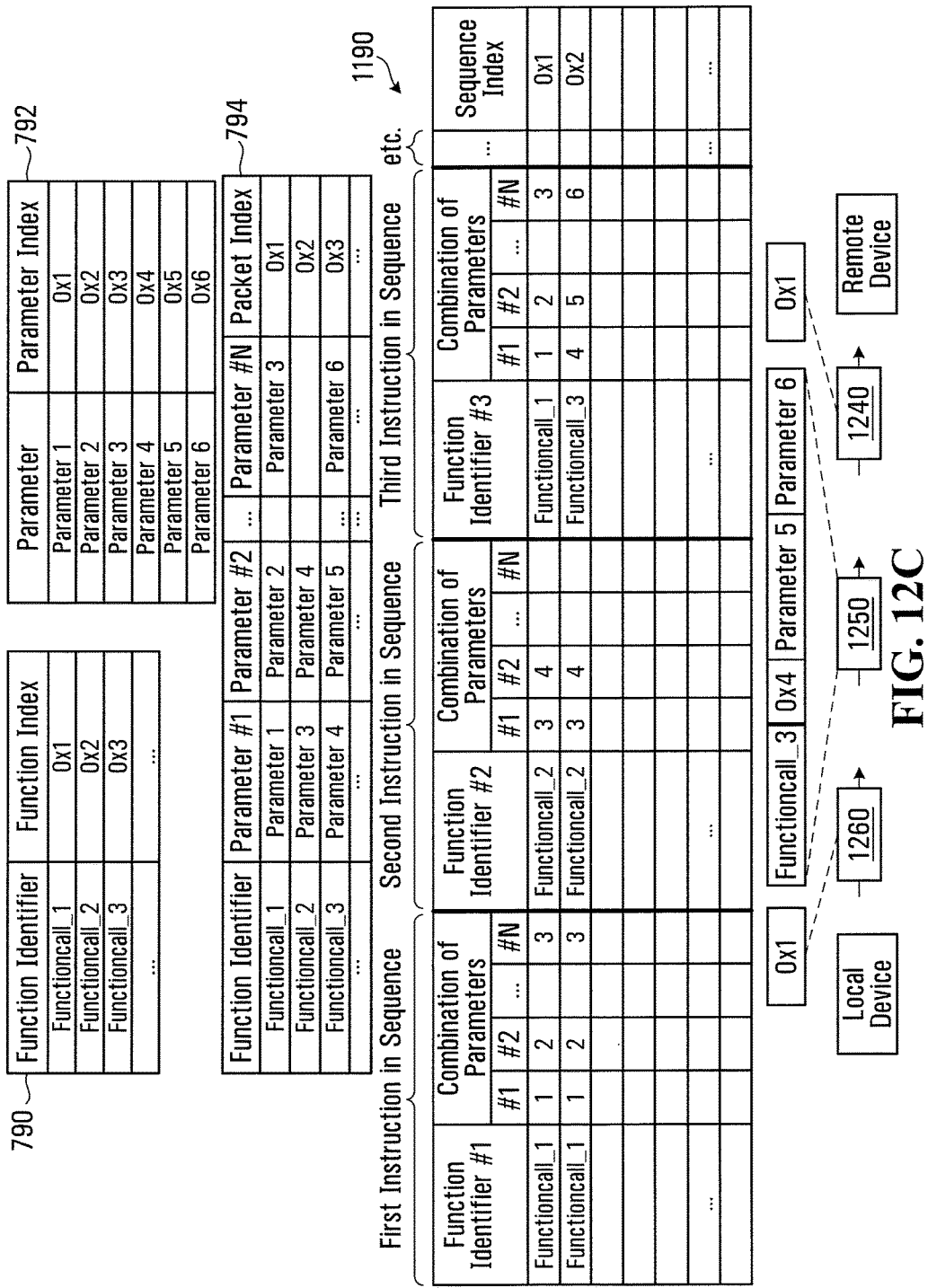
FIG. 12C conceptually illustrates the state of the function index table, the parameter index table, the packet dictionary and the sequence dictionary, after processing the second example sequence of three instructions, as well as the resulting packet, in accordance with a non-limiting embodiment of the present invention.

FIG. 12C shows the status of the packet dictionary 794, the function index table 790, the parameter index table 792 and the sequence dictionary 1190 after having received and processed the sixth instruction. Here it is seen that the parameter index table 792 includes two new entries, one for each of Param5 and Param6, which are associated with parameter indexes 0x5 and 0x6, respectively. The function index table 790 includes one new entry for Functioncall_3, which is associated with function index 0x3. The packet dictionary 794 includes one new entry for Functioncall_3 together with the combination of Param5, Param6, which is associated with packet index 0x3. Finally, the sequence dictionary 1190 includes a new second entry for the second sequence of three instructions, and which is associated with sequence index 0x2.

FIG. 12C also shows that three packets 1240, 1250, 1260 have been issued, corresponding to the three instructions in the second sequence:
Contents of Packet 1240:
packet index: 0x1;
Contents of Packet 1250:

```
function identifier: (Functioncall_3);
parameter index: 0x4;
parameters: Param5, Param6;
packet index: 0x1
```

Figure 13:
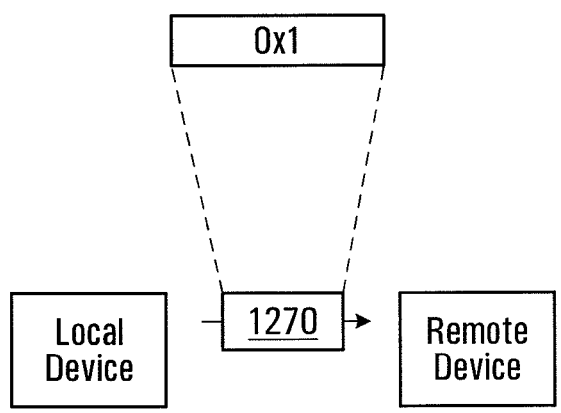
FIG. 13 conceptually illustrates the packet resulting from processing the third of three example sequences of instructions, in accordance with a non-limiting embodiment of the present invention.

Contents of Packet 1260:
Now consider what happens when processing the seventh, eighth and ninth instructions. It is seen that these three instructions in the current (third) sequence are identical to the three instructions in the first sequence, for which there is already a sequence index in the sequence dictionary 1190. As such, branch S1150 is taken after step S1130 in FIG. 11A, and there is no change to the status of the packet dictionary 794, the function index table 790, the parameter index table 792 or the sequence dictionary 1190 relative to FIG. 12C. Moreover, only one packet will be transmitted, representing the sequence of three instructions. Specifically, as shown in FIG. 13, packet 1270 is a very short packet that includes sequence index 0x1.
Contents of Packet 1270:
Sequence index: 0x1.

This is in contrast to transmitting three packets, one for each of the seventh, eighth and ninth instruction. Those skilled in the art will appreciate that packet 1270 may include a flag or header to indicate that it is conveying a sequence index rather than, say, a packet index.

It should be appreciated that in some embodiments, the detection of sequences can be done based on the packets output by the marshalling process of FIG. 7A, rather than directly on the basis of received instructions. That is to say, once packets have been created and are ready to be transmitted in accordance with the marshalling process of FIG.

7A, it is possible to analyze these packets in order to identify sequences of packets (rather than instructions) and issue condensed packets that include sequence numbers where possible.

Those skilled in the art will appreciate that a complementary unmarshalling process can be carried out at the remote device (e.g., the rendering server 100), so as to decode the sequence identifier where one is present in the incoming packet and, in the alternative, to assign a sequence identifier to an incoming sequence of packets.

1. Shared Packet Dictionary

It should be appreciated that in the course of the game state management process, due to the large volume of objects to be rendered, there may be a need to issue two or more rendering instructions such that they are processed at least partly in parallel. Another factor that may contribute to the need to execute multiple rendering instructions contemporaneously is where multiple participants are involved in the game. To satisfy this need, multiple local stubs can be running concurrently over the same period of time. In a simple scenario, which is used merely for illustrative purposes and is not to be viewed as limiting, a separate local stub is associated with each participant in the game. Each of the local stubs is invoked repeatedly so as to render a game scene for the corresponding participant with acceptable motion quality. The multiple local stubs cooperate with corresponding remote stubs in order to carry out multiple parallel executions of step S405 of the game state management process.

Figure 14A:
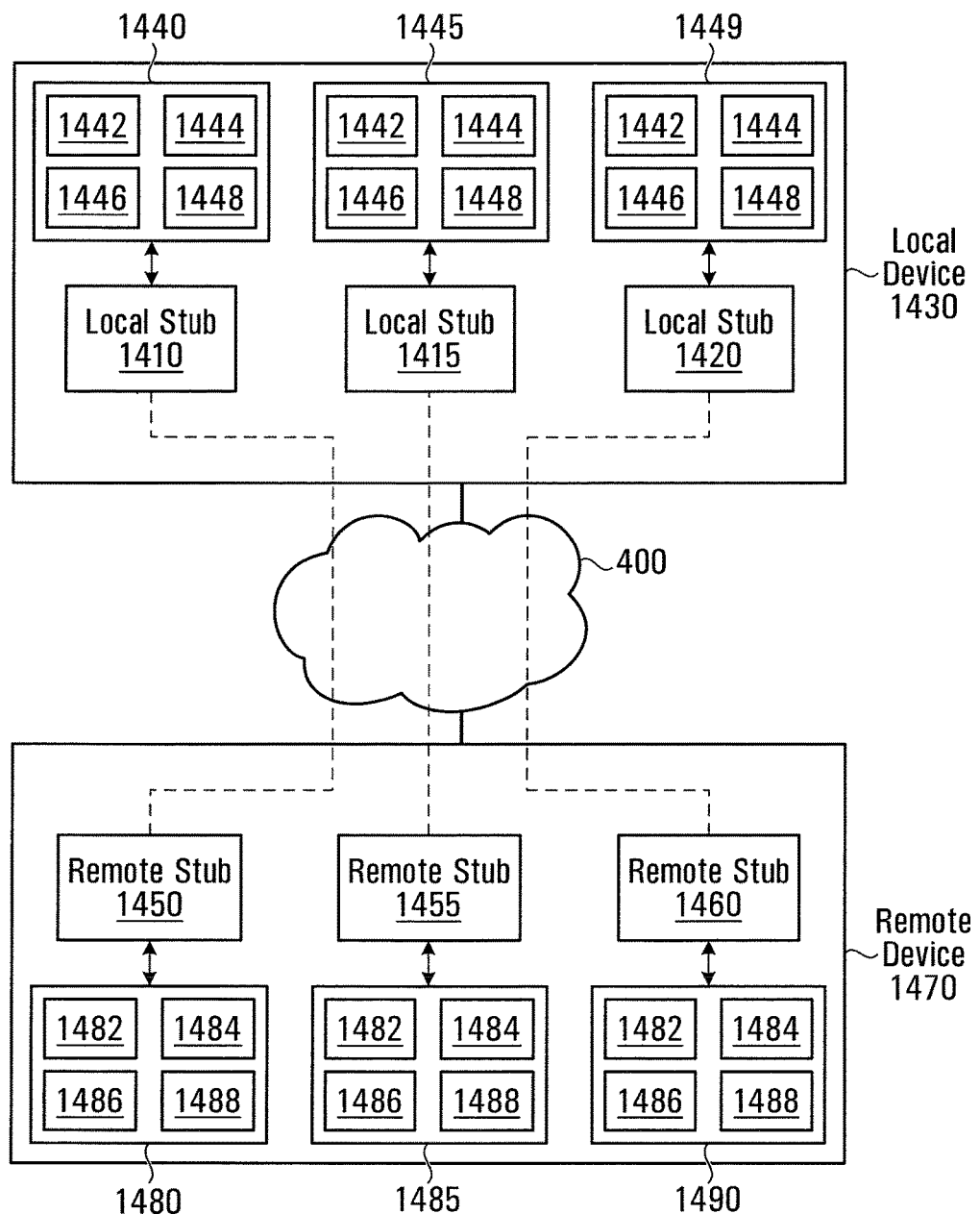
FIG. 14A is a block diagram conceptually illustrating an architecture by virtue of which a plurality of local stubs implemented on a common device maintain sets of mappings for themselves independently.
Figure 14B:
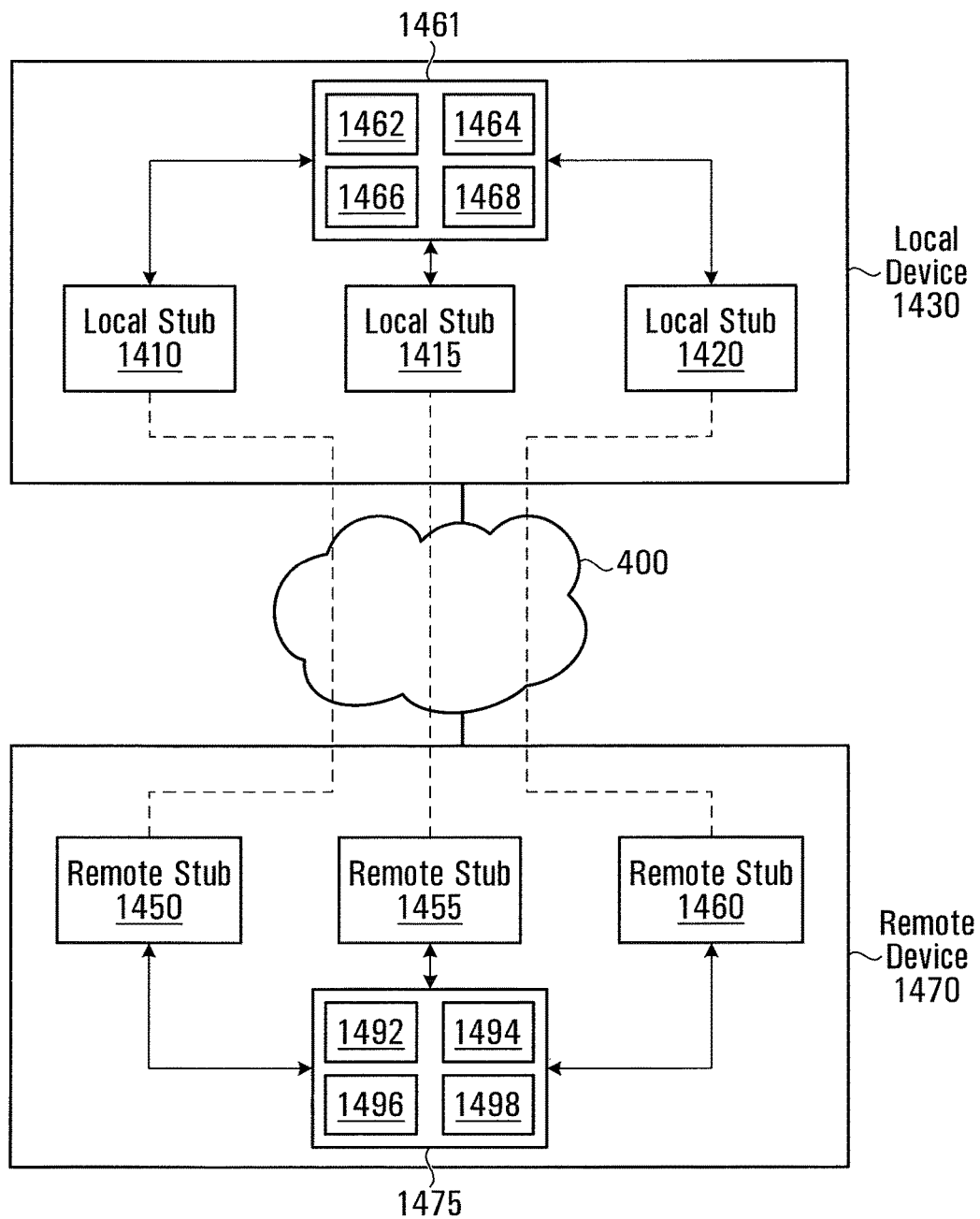
FIG. 14B is a block diagram conceptually illustrating an architecture by virtue of which a plurality of local stubs implemented on a common device share a common set of mappings.

Referring now to FIGS. 14A and 14B, three local stubs 1410, 1415, 1420 are instantiated on the same local device 1430. The local device 1430 executes the game state management process. The local stubs 1410, 1415, 1420 make remote procedure calls to corresponding remote stubs 1450, 1455, 1460 disposed on a common remote device 1470. It is to be understood that although the number of local and remote stubs is three, this is not to be considered a limitation of the present invention. In a non-limiting embodiment, the local device 1430 can be the central server 200 and the remote device 1470 can be the rendering server 100. The local device 1430 and the remote device 1470 may be connected by the network 450. The function calls made by local stub 1410 are marshaled into packets, which are then sent to and serviced by remote stub 1450. This can result in the rendering of game screens for a first participant in the game. Likewise, function calls made by local stub 1415 are marshaled into packets, which are then sent to and serviced by remote stub 1455, while function calls made by local stub 1420 are marshaled into packets, which are then sent to and serviced by remote stub 1460. This results in the rendering of game screens for a second and a third participant in the game, respectively.

In the non-limiting embodiment shown in FIG. 14A, the three local stubs 1410, 1415, 1420 have access to respective memory spaces 1440, 1445, 1449. Memory space 1440 includes a function index table 1442, a parameter index table 1444 and a packet dictionary 1446 for use by local stub 1410. Memory space 1440 may also include a sequence dictionary 1448 when useful or desired. The function index table 1442, the parameter index table 1444, the packet dictionary 1446 and the sequence dictionary 1448 are accessed by local stub 1410 when executing a marshalling process for participant #1. For their part, memory spaces 1445 and 1449 are similarly configured, with a respective function index table, a respective parameter index table, a respective packet dictionary and possibly also a respective sequence dictionary. These separate memory spaces 1445, 1450 are separately accessed by local stubs 1415, 1420 when executing distinct marshalling processes for participants #2 and #3, respectively.

At the remote device 1470, the three remote stubs 1450, 1455, 1460 have access to respective memory spaces 1480, 1485, 1490. Memory space 1480 includes a function index table 1482, a parameter index table 1484 and a packet dictionary 1486 for use by remote stub 1450. Memory space 1480 may also include a sequence dictionary 1488 when useful or desired. The function index table 1482, the parameter index table 1484, the packet dictionary 1486 and the sequence dictionary 1488 are accessed by remote stub 1450 when executing an unmarshalling process for participant #1. For their part, memory spaces 1485 and 1490 are similarly configured, with a respective function index table, a respective parameter index table, a respective packet dictionary and possibly also a respective sequence dictionary. These separate memory spaces 1485, 1490 are separately accessed by remote stubs 1455, 1460 when executing distinct unmarshalling processes for participants #2 and #3, respectively In another non-limiting embodiment, shown in FIG. 14B, the three local stubs 1410, 1415 1420 have access to a shared memory space 1461. The shared memory space 1461 includes a common function index table 1462, a common parameter index table 1464 and a common packet dictionary 1466. The shared memory space 1461 may also include a common sequence dictionary 1468 when useful or desired. Therefore, the function index table 1462, the parameter index table 1464, the packet dictionary 1466 and the sequence dictionary 1468 are commonly accessed by local stubs 1410, 1415, 1420 executing distinct marshalling processes for participants #1, #2 and #3, respectively.

The shared memory space 1461 may be configured in various ways. For example, the shared memory space 1461 can be maintained in the central RAM 203 or the central storage medium 204. In another non-limiting embodiment, the shared memory space 1461 can be maintained on external storage, which is accessible to the central server 200 via a local storage area network (SAN), the network 450 or the network 400.

At the remote device 1470, the three remote stubs 1450, 1455 1460 have access to a shared memory space 1475. The shared memory space 1475 includes a common function index table 1492, a common parameter index table 1494 and a common packet dictionary 1496. The shared memory space 1475 may also include a common sequence dictionary 1498 when useful or desired. Therefore, the function index table 1492, the parameter index table 1494, the packet dictionary 1496 and the sequence dictionary 1498 are commonly accessed by remote stubs 1450, 1455, 1460 executing distinct unmarshalling processes for participants #1, #2 and #3, respectively.

The shared memory space 1475 may be configured in various ways. For example, the shared memory space 1475 can be maintained in the RAM 103 or the storage medium 104. In another non-limiting embodiment, the shared memory space 1475 can be maintained on external storage, which is accessible to the rendering server 100 via a local storage area network (SAN), the network 450 or the network 400.

It will be appreciated that use of a shared memory space 1461 by local stubs 1410, 1415, 1420 and use of the shared memory space 1475 by remote stubs 1450, 1455, 1460 allows function calls to be even more efficient in terms of bandwidth usage. That is to say, efficiency rises with repetition in function calls and repetition in function calls is more likely when measured across multiple participants rather than on a per-participant basis.

Figure 15:
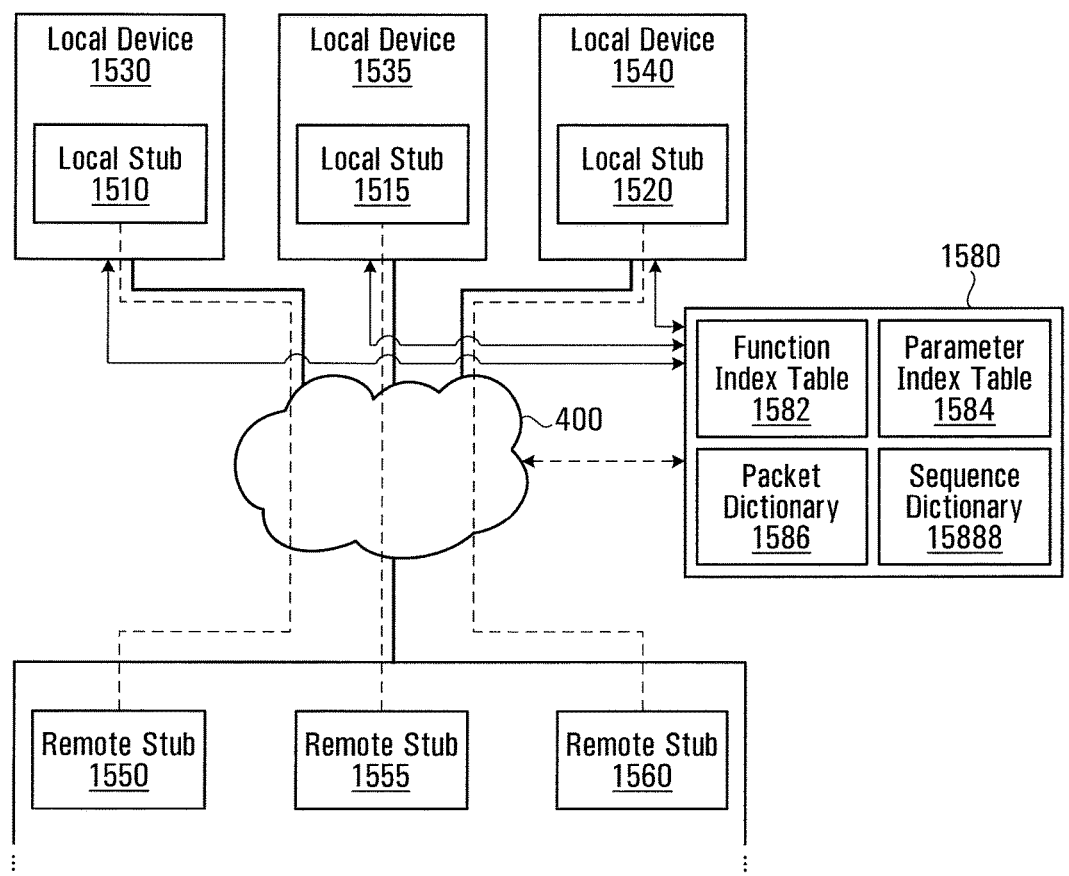
FIG. 15 is a block diagram conceptually illustrating an architecture by virtue of which a plurality of local stubs implemented on multiple devices share a common set of mappings.

Reference is now made to FIG. 15, which illustrates a non-limiting embodiment in which three local stubs 1510, 1515, 1520 are instantiated on three separate local devices 1530, 1535, 1540. The local stubs 1510, 1515, 1520 make remote procedure calls to corresponding remote stubs 1550, 1555, 1560. In one embodiment, remote stubs 1550, 1555, 1560 are instantiated on a single remote device 1570. In other embodiments, the remote stubs 1550, 1555, 1560 may be instantiated on separate remote devices. It is to be understood that although the number of local and remote stubs is three, this is not to be considered a limitation of the present invention.

In one non-limiting embodiment, the local devices 1530, 1545, 1540 can be sub-portions of a distributed central server 200, while the remote device 1570 can be the rendering server 100. In such an embodiment, the game state management process may be run by one of the local devices 1530, 1535, 1540 that is designated as the "master", or the game state management process may be collaboratively/distributedly executed by the local devices 1530, 1535, 1540.

In another non-limiting embodiment, the local devices 1530, 1545, 1540 can be game consoles, while the remote device 1570 can be the rendering server 100 or the central server 200. In such an embodiment, the game state management process may be run by one of the game consoles that is designated as the "master", or the game state management process may be collaboratively/distributedly executed by the various game consoles.

Local stub 1510 responds to the receipt of instructions by executing a marshalling process to create packets, which are sent to and serviced by remote stub 1550. This can result in the rendering of game screens for a first participant in the game. Likewise, local stubs 1515, 1520 execute their own marshalling processes that result in the transmission of packets to remote stubs 1555, 1560, respectively. This results in the rendering of game screens for a second and a third participant in the game, respectively.

The three local stubs 1510, 1515, 1520 have access to a shared memory space 1580. The shared memory space 1580 includes a common function index table 1582, a common parameter index table 1584 and a common packet dictionary 1586. The shared memory space 1580 may also include a common sequence dictionary 1588 when useful or desired. Therefore, the function index table 1582, the parameter index table 1584, the packet dictionary 1586 and the sequence dictionary 1588 are commonly accessed by local stubs 1510, 1515, 1520 executing distinct marshalling processes for participants #1, #2 and #3, respectively.

The shared memory space 1580 may be configured in various ways. For example, one possibility is for the shared memory space 1580 to be maintained in the memory (e.g., RAM or other storage medium) of one of the local devices 1530, 1535, 1540 and continuously accessed by the local stubs 1510, 1515, 1520, including those that are outside of the local device where the shared memory space is located.

Another possibility, shown in FIG. 15, is for the shared memory space 1580 to be maintained on external storage, which is accessible to the local devices 1530, 1535, 1540 via a storage area network (SAN) and/or the network 450 or the network 400.

Yet another possibility is for the shared memory space 1580 to be replicated within each of the local devices 1530, 1535, 1540 (e.g., within a cache) so as to provide faster access to the function index table 1582, the parameter index table 1584, the common packet dictionary 1586 (and the sequence dictionary 1588, when used). In this way, the local devices 1530, 1535, 1540 can carry out a protocol for building copies of the shared memory space 1580 in each of the local devices 1530, 1535, 1540.

Since the remote stubs 1550, 1555, 1560 are executed by a single remote device 1570, the may be configured as previously described with reference to FIG. 14B.

Some of the above examples have focused on remote procedure calls that involve rendering commands in a gaming environment. However, this is not to be considered a limitation of the present invention. For example, another suitable example of a remote procedure call in a gaming environment includes an instruction to initialize a process. Still other examples of a remote procedure call in a gaming environment include fetching the leader-board, finding other players or retrieving game news. Moreover, it should be appreciated that the present invention is not limited to a gaming environment.

Those skilled in the art will appreciate that efficiencies may also arise by compressing remote procedure calls in the opposite direction, i.e., in the course of issuing remote procedure calls from the rendering server 100 to the central server 200 in order to send rendered game screens thereto, for distribution to the client devices 300.

Those skilled in the art will appreciate that certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A device connectable to a remote device, the device comprising:
a processor; and
a first memory including program instructions that, when executed by the processor, cause the processor to:
obtain at least one rendering instruction for execution by the remote device;
create a packet representing the at least one rendering instruction; and
release the packet towards the remote device,
wherein the at least one rendering instruction is for rendering at least a portion of a game screen of a video game and comprises a combination of parameters for use in execution of a function by the remote device,
the processor consults the first memory or a second memory to determine, as a first determination, whether a packet index has already been assigned to the at least one rendering instruction,
when the first determination is positive, the processor formulates the packet to contain the packet index,
when the first determination is negative, the processor further consults the first memory or the second memory to secondly determine, as a second determination, whether a parameter index has already been assigned to each of individual parameters in the combination of parameters, and when the second determination is positive, the processor formulates the packet to contain the parameter index for each of the individual parameters in the combination of parameters.

2. The device according to claim 1, wherein the at least one rendering instruction further comprises an identifier of the function for execution by the remote device.

3. The device according to claim 2, wherein the processor determines whether the packet index has already been assigned to the at least one rendering instruction by determining whether a packet dictionary in the first memory or the second memory comprises an entry corresponding to the identifier of the function and the combination of parameters.

4. The device according to claim 2, wherein
when the first determination is negative, the processor further consults the first memory or the second memory to thirdly determine, as a third determination, whether a function index has already been assigned to the combination of parameters; and
when the third determination is positive, the processor formulates the packet to contain the function index.

5. The device according to claim 1, wherein the processor further identifies, when the second determination is negative, one or more of the individual parameters that are not associated with previously assigned parameter indexes; and
for each parameter of the one or more of the individual parameters, the processor assigns a respective parameter index and stores the respective parameter index in a parameter index table in association with the parameter.

6. A non-transitory computer-readable medium storing instructions for execution by at least one processor of a local device, wherein execution of the instructions by the at least one processor of the local device causes the local device to implement a method that comprises:
obtaining an identifier of at least one command for execution by a remote device, the at least one command comprising a combination of parameters for use in execution of a function by the remote device;
creating a packet representing the at least one command; and
releasing the packet towards the remote device;
wherein the creating of the packet comprises:
consulting a memory to determine, as a first determination, whether a packet index has already been assigned to the at least one command;
when the first determination is positive, formulating the packet to contain the packet index;
when the first determination is negative, consulting the memory to secondly determine, as a second determination, whether a parameter index has already been assigned to each of individual parameters in the combination of parameters; and
when the second determination is positive, formulating the packet to contain the parameter index for each of the individual parameters in the combination of parameters.

7. A device connectable to a first device, the device comprising:
a processor; and
a memory including instructions that, when executed by the processor, cause the processor to:
obtain from the first device a packet representing at least one rendering instruction, the at least one rendering instruction being for rendering at least a portion of a game screen of a video game and comprising a combination of parameters for use in execution of a remote function call placed by the first device;
determine, as a first determination, whether the packet contains a packet index;
when the first determination is positive, consult a packet dictionary based on the packet index to identify a function associated with the remote function call and to determine the combination of parameters associated with the remote function call;
when the first determination is negative, determine, as a second determination, whether the packet contains a parameter index for each of individual parameters in the combination of parameters associated with the remote function call;
when the second determination is positive, consult a parameter index table based on the parameter index for each of individual parameters to identify the individual parameters in the combination of parameters associated with the remote function call; and
carry out the function using the individual parameters in the combination of parameters.

8. The device according to claim 7, wherein, when the first determination is positive, to determine the combination of parameters associated with the remote function call, the processor determines from the packet dictionary, based on the packet index, a combination of parameter indexes associated with the combination of parameters and consults the parameter index table on a basis of parameter indexes in the combination of parameter indexes to determine the individual parameters in the combination of parameters.

9. The device according to claim 7, wherein, when the first determination is positive, to identify the function associated with the remote function call, the processor determines from the packet dictionary, based on the packet index, at least one function index and consults a function table on a basis of the function index to identify the function associated with the remote function call.

10. The device according to claim 9, further comprising:
obtaining from the first device a second packet comprising an identity of the function associated with the remote function call,
wherein the memory or a second memory stores the identity of the function in the function table in association with the function index.

* * * * *